(12) United States Patent
Cook et al.

(10) Patent No.: US 8,278,784 B2
(45) Date of Patent: Oct. 2, 2012

(54) WIRELESS POWER TRANSMISSION FOR ELECTRONIC DEVICES

(75) Inventors: Nigel P Cook, El Cajon, CA (US); Lukas Sieber, Olten (CH); Hanspeter Widmer, Wohlenschwil (CH)

(73) Assignee: Qualcomm Incorporated, San Diego, CA (US)

( * ) Notice: Subject to any disclaimer, the term of this patent is extended or adjusted under 35 U.S.C. 154(b) by 186 days.

(21) Appl. No.: 12/510,123

(22) Filed: Jul. 27, 2009

(65) Prior Publication Data

US 2010/0109443 A1 May 6, 2010

Related U.S. Application Data

(60) Provisional application No. 61/084,246, filed on Jul. 28, 2008.

(51) Int. Cl.
*H05K 7/14* (2006.01)
(52) U.S. Cl. .......................................................... 307/149
(58) Field of Classification Search .................. 307/149, 307/104
See application file for complete search history.

(56) References Cited

U.S. PATENT DOCUMENTS

| 5,198,826 | A | 3/1993 | Ito |
| 7,009,860 | B2 | 3/2006 | Kazutoshi |
| 7,741,734 | B2 | 6/2010 | Joannopoulos et al. |
| 7,825,543 | B2 | 11/2010 | Karalis et al. |
| 2007/0182658 | A1 | 8/2007 | Ozden |
| 2007/0267918 | A1 | 11/2007 | Gyland |
| 2008/0116846 | A1 | 5/2008 | Greenfeld et al. |
| 2008/0211455 | A1 | 9/2008 | Park et al. |
| 2008/0278264 | A1 | 11/2008 | Karalis et al. |
| 2009/0015075 | A1* | 1/2009 | Cook et al. ................. 307/149 |

FOREIGN PATENT DOCUMENTS

| WO | WO2005109597 A1 | 11/2005 |
| WO | WO2007150070 A2 | 12/2007 |
| WO | WO2008133388 A1 | 11/2008 |

OTHER PUBLICATIONS

International Search Report and Written Opinion—PCT/US2009/051997, International Search Authority—European Patent Office—Jul. 28, 2009.

Birca-Galateanu, S., "Low peak current Class E resonant full-wave low dv/dt rectifier driven by a square wave voltage generator", Power Electronics Specialists Conference 1999 (PESC '99), 30th Annual IEEE, Publication Date: Aug. 1999, pp. 469-474, vol. 1.

(Continued)

*Primary Examiner* — Robert L. Deberadinis
(74) *Attorney, Agent, or Firm* — Knobbe Martens Olson & Bear LLP

(57) ABSTRACT

Exemplary embodiments are directed to wireless power transfer. A wireless power receiver includes a receive antenna for coupling with a transmit antenna of transmitter generating a magnetic near field. The receive antenna receives wireless power from the magnetic near field and includes a resonant tank and a parasitic resonant tank wirelessly coupled to the resonant tank. A wireless power transmitter includes a transmit antenna for coupling with a receive antenna of a receiver. The transmit antenna generates a magnetic near field for transmission of wireless power and includes a resonant tank and a parasitic resonant tank coupled to the resonant tank.

23 Claims, 26 Drawing Sheets

OTHER PUBLICATIONS

Ekbote, et al., "Comparison of Class E and Half Bridge Inverters for use in Electronic Ballasts," Industry Applications Conference, 2006. 41st IAS Annual Meeting. Conference Record of the 2006 IEEE, vol. 5, pp. 2198-2201, Publication Date: Oct. 8-12, 2006.

Ellinger, F., "Radio Frequency Integrated Circuits and Technologies, Springer-Verlag Berlin Heidelberg New York, 2007, ISBN-13 978-3-540-35788-9, Chapter 9, Power amplifiers" in particular section 9.3 'Switched amplifiers' (pp. 321-323).

Erickson, et al., "Fundamentals of Power Electronics", Second Edition, Springer Science + Business Media, 2001, ISBN:978-0-7923-7270-7, Chapter 2, section 2.4 'Cuk converter pp. 27-31.

Etsi En 300 330-1 V1.5.1 (Apr. 2006) Electromagnetic compatibility and Radio spectrum Matters (ERM); Short Range Devices (SRD); Radio equipment in the frequency range 9 kHz to 25 MHz and inductive loop systems in the frequency range 9 kHz to 30 MHz; Part 1: Technical characteristics and test methods, pp. 1-62.

Frey, R., "500W, Class E 27.12 MHz Amplifier Using a Single Plastic MOSFET," Application note Advanced Power Technology, APT9903, Jun. 1999, pp. 1-7.

Gu, et al., "A Circuit Model for the Class E Resonant DC-DC Converter Regulated at a Fixed Switching Frequency," IEEE Transactions on Power Electronics, vol. 7, No. 1, pp. 99-110, Jan. 1992.

Gu, et al., "A New Method to Regulate Resonant Converters," IEEE Transactions on Power Electronics, vol. 3, No. 4, pp. 430-439, Oct. 1988.

Gu, et al., "Dynamic analysis of Class E resonant DC-DC converter regulated under fixed switching frequency," Power Electronics Specialists Conference 1989 (PESC '89) Record., 20th Annual IEEE, Publication Date: Jun. 26-29, 1989, pp. 213-220.

Harada, et al., "Steady state analysis of Class E resonant DC-DC converter regulated under fixed switching frequency," Power Electronics Specialists Conference 1988. (PESC '88) Record., 19th Annual IEEE, Publication Date: Apr. 11-14, 1988, pp. 3-8.

Ivascu, et al., "Class E Resonant Low dv/dt Rectifier," IEEE Transactions on Circuits and Systems-1: Fundamental Theory and Applications, vol. 39, No. 8, pp. 604-612, Aug. 1992.

Kazimierczuk, et al., "Class E Resonant Rectifier with a Series Capacitor," IEEE Transactions on circuits and systems-1: Fundamental Theory and Applications, vol. 41, No. 12, pp. 885-889, Dec. 1994.

Sokal, "Class-E Rf Power Amplifiers," QEX, Jan./Feb. 2001, pp. 9-20.

Sony Press Release Article, "Sony develops highly efficient wireless power transfer system based on magnetic resonance," dated Oct. 2, 2009, retrieved from: http://www.physorg.com/news173714272.html.

ST Microelectronics, How to Extend the Operating Range of the CRX14 Contactless Coupler Chip, Application Note AN1954, v.2, Feb. 14, 2006, 25 pages.

* cited by examiner

WIRELESS POWER TRANSMISSION FOR ELECTRONIC DEVICES

CLAIM OF PRIORITY UNDER 35 U.S.C. §119

This application claims priority under 35 U.S.C. §119(e) to:

U.S. Provisional Patent Application 61/084,246 entitled "WIRELESS POWERING & CHARGING" filed on Jul. 28, 2008, the disclosure of which is hereby incorporated by reference in its entirety.

BACKGROUND

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the radiation or receiving efficiency. This approach suffers from the fact that the power coupling falls off quickly with distance between the antennas. So charging over reasonable distances (e.g., in the range of 0.5 to 2 meters) becomes inefficient. Additionally, since the transmitting system radiates plane waves, unintentional radiation can interfere with other systems if not properly controlled through filtering.

Other approaches to wireless energy transmission are based on inductive coupling between a transmit antenna embedded, for example, in a "charging mat" or surface and a receive antenna (and a rectifying circuit) embedded in the host electronic device to be charged. This approach has the disadvantage that the spacing between transmit and receive antennas must be very close (e.g., within several centimeters). Though this approach does have the capability to simultaneously charge multiple devices in the same area, this area is typically very small and requires the user to accurately locate the devices to a specific area. Therefore, there is a need to provide a wireless charging arrangement that accommodates flexible placement and orientation of transmit and receive antennas.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" are used herein to mean any form of energy associated with electric fields, magnetic fields, electromagnetic fields, or otherwise that is transmitted between a transmitter to a receiver without the use of physical electromagnetic conductors. Power conversion in a system is described herein to wirelessly charge devices including, for example, mobile phones, cordless phones, iPod, MP3 players, headsets, etc. Generally, one underlying principle of wireless energy transfer includes magnetic coupled resonance (i.e., resonant induction) using frequencies, for example, below 30 MHz. However, various frequencies may be employed including frequencies where license-exempt operation at relatively high radiation levels is permitted, for example, at either below 135 kHz (LF) or at 13.56 MHz (HF). At these frequencies normally used by Radio Frequency Identification (RFID) systems, systems must comply interference and safety standards such as EN 300330 in Europe or FCC Part 15 norm in the United States. By way of illustration and not limitation, the abbreviations LF and HF are used herein where "LF" refers to $f_0$=135 kHz and "HF" to refers to $f_0$=13.56 MHz.

Figure 1:
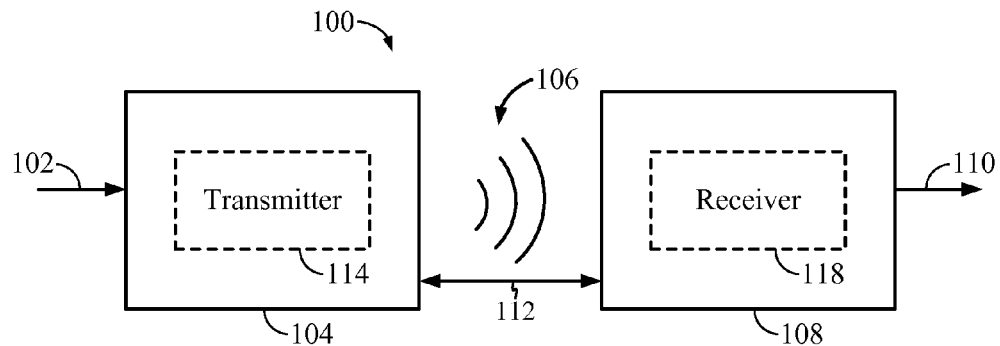
FIG. 1 illustrates a simplified block diagram of a wireless power transmission system.

FIG. 1 illustrates wireless power transmission system 100, in accordance with various exemplary embodiments. Input power 102 is provided to a transmitter 104 for generating a magnetic field 106 for providing energy transfer. A receiver 108 couples to the magnetic field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are matched, transmission losses between the transmitter 104 and the receiver 108 are minimal when the receiver 108 is located in the "near-field" of the magnetic field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. In this near-field, a coupling may be established between the transmit antenna 114 and the receive antenna 118. The area around the antennas 114 and 118 where this near-field coupling may occur is referred to herein as a coupling-mode region.

Figure 2:
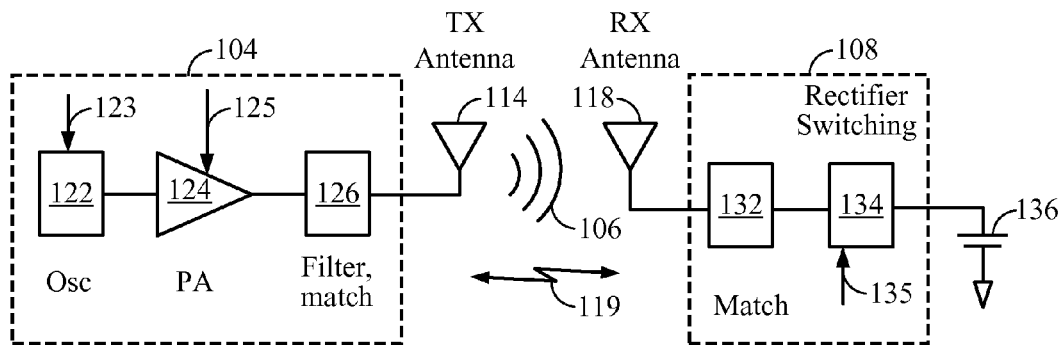
FIG. 2 illustrates a simplified schematic diagram of a wireless power transmission system.

FIG. 2 shows a simplified schematic diagram of a wireless power transmission system. The transmitter 104 driven by input power 102 includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118.

Figure 3:
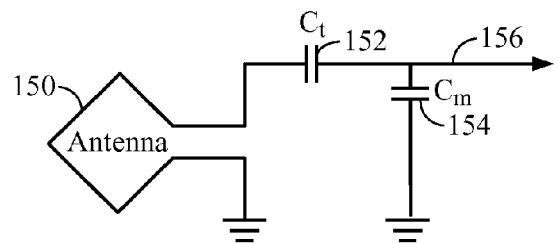
FIG. 3 illustrates a schematic diagram of a loop antenna, in accordance with exemplary embodiments.

As illustrated in FIG. 3, antennas used in exemplary embodiments may be configured as a "loop" antenna 150, which may also be referred to herein as a "magnetic" or "resonant" antenna. Loop antennas may be configured to include an air core or a physical core such as a ferrite core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more effective.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates a sinusoidal or quasi-sinusoidal signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases for "vicinity" coupled devices. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since most of the environment possibly surrounding the antennas is dielectric and thus has less influence on a magnetic field compared to an electric field. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling efficiency (e.g., >10%) to a small Rx antenna at significantly larger distances than allowed by far field and inductive approaches mentioned earlier. If the Tx antenna is sized correctly, high coupling efficiencies (e.g., 30%) can be achieved when the Rx antenna on a host device is placed within a coupling-mode region (i.e., in the near-field) of the driven Tx loop antenna The various exemplary embodiments disclosed herein identify different coupling variants which are based on different power conversion approaches, and the transmission range including device positioning flexibility (e.g., close "proximity" coupling for charging pad solutions at virtually zero distance or "vicinity" coupling for short range wireless power solutions). Close proximity coupling applications (strongly coupled regime, coupling factor typically k>0.1)

provide energy transfer over short or very short distances typically in the order of Millimeters or Centimeters depending on the size of the antennas. Vicinity coupling applications (loosely coupled regime, coupling factor typically k<0.1) provide energy transfer at relatively low efficiency over distances typically in the range from 10 cm to 2 m depending on the size of the antennas.

As described herein, "proximity" coupling and "vicinity" coupling may be considered as different methods of matching the power source/sink to the antenna/coupling network. Moreover, the various exemplary embodiments provide system parameters, design targets, implementation variants, and specifications for both LF and HF applications and for the transmitter and receiver. Some of these parameters and specifications may vary, as required for example, to better match with a specific power conversion approach. System design parameters may include various priorities and tradeoffs. Specifically, transmitter and receiver subsystem considerations may include high transmission efficiency, low complexity of circuitry resulting in a low-cost implementation.

Figure 4A:
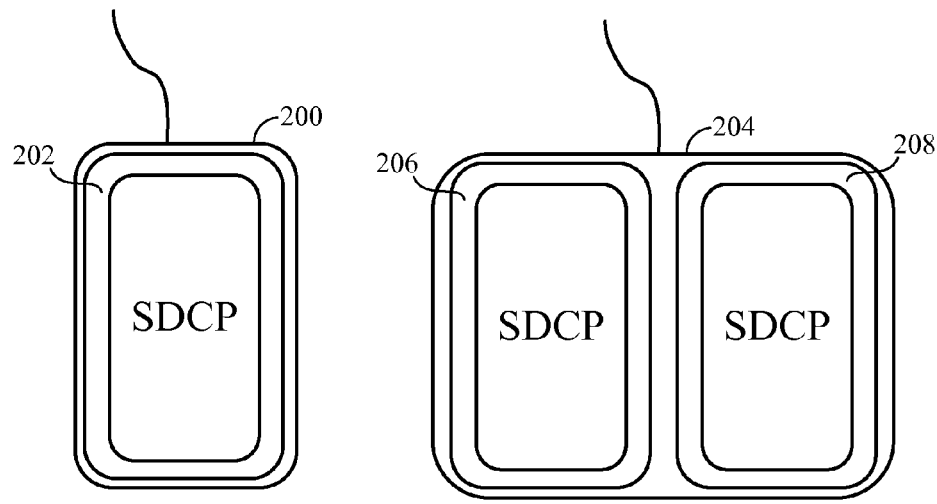
FIGS. 4A-4C illustrate a physical implementation of a wireless power transmission system including a transmitter and receiver, in accordance with exemplary embodiments.
Figure 4B:
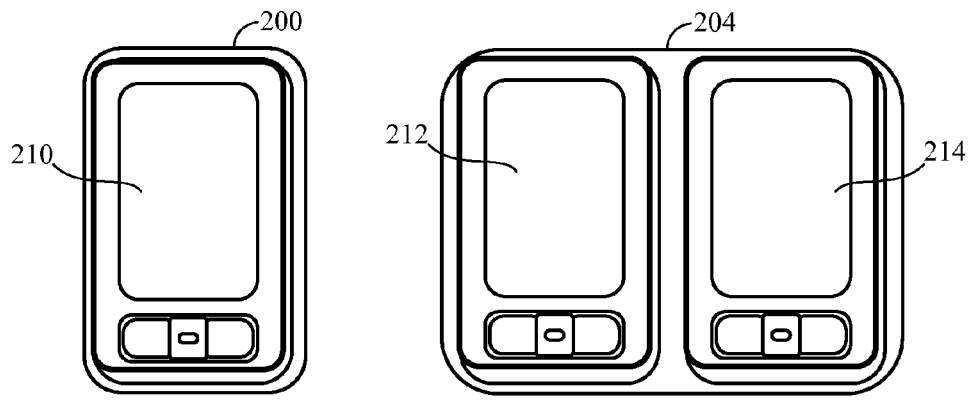
Figure 4C:
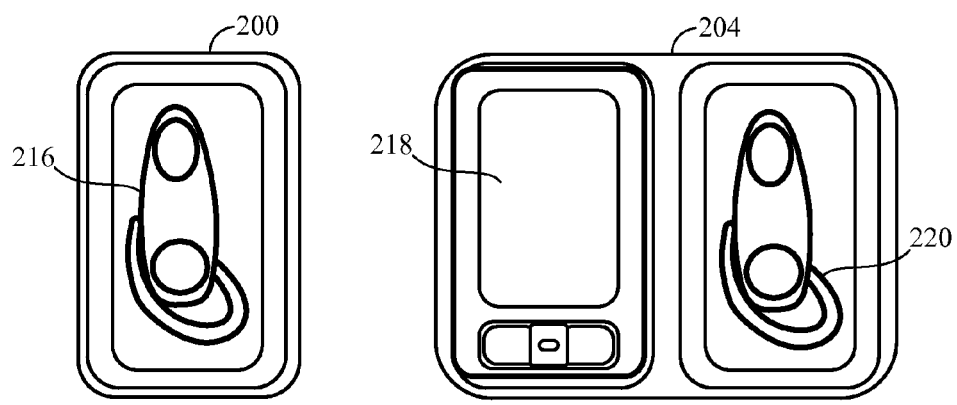

FIGS. 4A-4C illustrate a physical implementation of a wireless power transmission system including a transmitter and receiver, in accordance with exemplary embodiments. In one exemplary embodiment of FIG. 4A, a transmitter may be configured within a Single Device Charging Pad (SDCP) 200 including a transmit antenna 202. SDCP 200 may also be scalable and extended to a multiple device charging pad 204 including transmit antenna 206 and transmit antenna 208, illustrated in FIG. 4A to include a plurality of SDCPs. FIG. 4B illustrates an SDCP 200 including a transmit antenna (not shown) coupling with a device (e.g., cellphone, PDA, MP3 player, etc.) including a receive antenna (not shown) for receiving wirelessly transferred power at a device 210. FIG. 4B also illustrates a multiple device charging pad 204 including a first transmit antenna (not shown) and a second transmit antenna (not shown) for respectively charging device 212 and device 214. Similarly, FIG. 4C illustrates an SDCP 200 including a transmit antenna (not shown) coupling with another form factor micro device 216 (e.g., wireless headset, etc.) including a receive antenna (not shown) for receiving wirelessly transferred power at device 216. FIG. 4C also illustrates a multiple device charging pad 204 including a first transmit antenna (not shown) and a second transmit antenna (not shown) for respectively charging device 218 and device 220.

SDCPs may be variously configured and variously capable, by way of example and not limitation, an SDCP may be configured for high efficiency charging for medium size devices requiring a charging power in the order of 4 Watts. Alternatively, an SDCP may be configured for medium efficiency charging for small form factor very low power devices such as headsets, MP3 players, etc. requiring a charging power below 1 Watt.

Figure 5A:
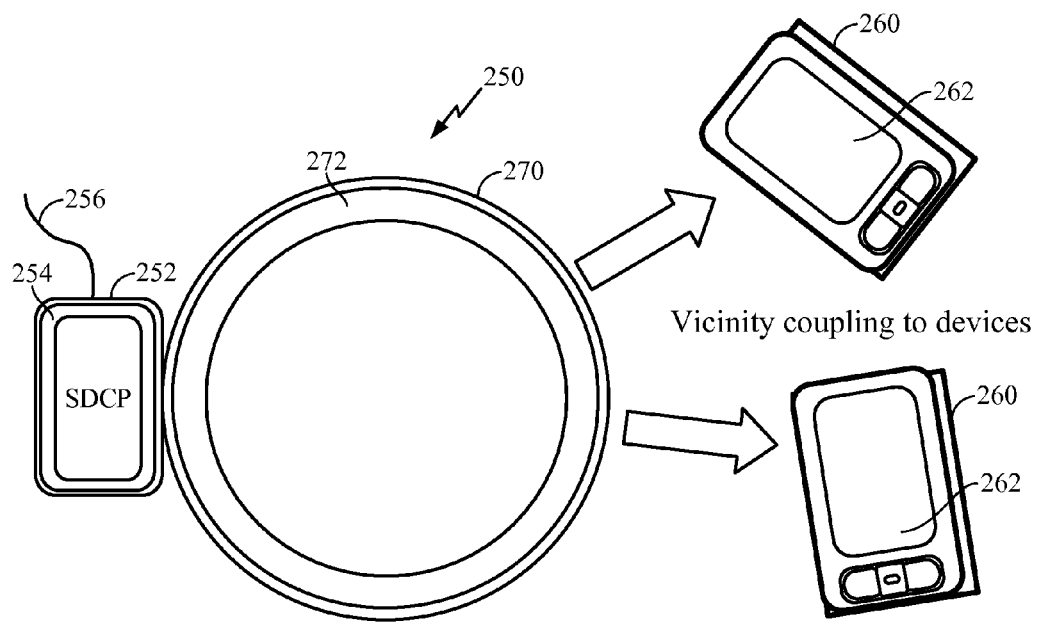
FIGS. 5A-5B illustrate a physical implementation of a transmitter, energy relay and receiver, in accordance with exemplary embodiments.
Figure 5B:
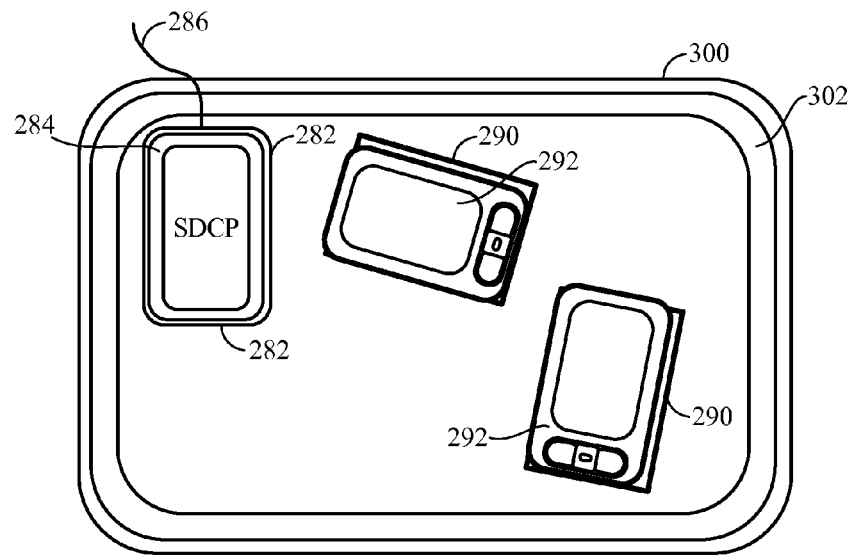

FIGS. 5A-5B illustrate a physical implementation of a wireless power transmission system including a transmitter, energy relay and receiver, in accordance with exemplary embodiments. Wireless power transfer may be extended using a parasitic resonant antenna, also known as an "energy relay" coil/antenna/loop or "repeater" coil/antenna/loop. While "vicinity" coupling between a transmitter and receiver may not provide high efficiency energy transfer, "vicinity" coupling provides flexibility in positioning of the receiver (with the device attached thereto) with respect to the transmitter antenna.

FIG. 5A illustrates a configuration of wireless power transmission system including an intermediate energy relay, in accordance with an exemplary embodiment. A wireless power transmission system 250 includes a transmitter 252 illustrated as a SDCP. The transmitter 252 further includes a transmit antenna 254 and the transmitter 252 receives input power 256.

Wireless power transmission system 250 further includes one or more receivers 260 coupled to or integrated within respective devices and are located at a distance from transmitter 252. Wireless power transmission system 250 further includes an energy relay 270 including a relay antenna 272. As illustrated in FIG. 5A, the energy relay 270 operates as an intermediate energy relay between the transmitter 252 and the receiver(s) 260, the coupling of which between the transmitter and receiver(s) may be referred to as "vicinity" coupling.

In operation, transmitter 252 functions as an "exciter" of energy relay 270 resulting generation of a magnetic near-field around the relay antenna 272. The magnetic near-field of energy relay 270 then couples to receive antenna(s) 262 of receiver(s) 260. Accordingly, intermediate energy relay 270 facilitates the transfer of the energy exhibited at the transmit antenna 254 to effectively be received at the receiver antenna(s) 262. By way of example, a typical Q-value for energy relay 270 may be on the order of Q-value of between 300 and 800.

FIG. 5B illustrates a configuration of wireless power transmission system including an encompassing energy relay, in accordance with an exemplary embodiment. A wireless power transmission system 280 includes a transmitter 282 illustrated as a SDCP. The transmitter 282 further includes a transmit antenna 284 and the transmitter 282 receives input power 286.

Wireless power transmission system 280 further includes one or more receivers 290 coupled to or integrated within respective devices and are located at a distance from transmitter 282. Wireless power transmission system 280 further includes an energy relay 300 including a relay antenna 302. As illustrated in FIG. 5B, the energy relay 300 operates as an intermediate energy relay between the transmitter 282 and the receiver(s) 290, the coupling of which between the transmitter and receiver(s) may also be referred to as "vicinity" coupling.

In operation, transmitter 282 functions as an "exciter" of energy relay 300 generation of a magnetic near-field around the relay antenna 302. The magnetic near-field of energy relay 300 then couples to receive antenna(s) 292 of receiver(s) 290. Accordingly, intermediate energy relay 300 facilitates the transfer of the energy exhibited at the transmit antenna 284 to effectively be received at the receiver antenna(s) 292. By way of example, a typical Q-value for energy relay 300 may be on the order of Q-value of between 300 and 800.

Figure 6:
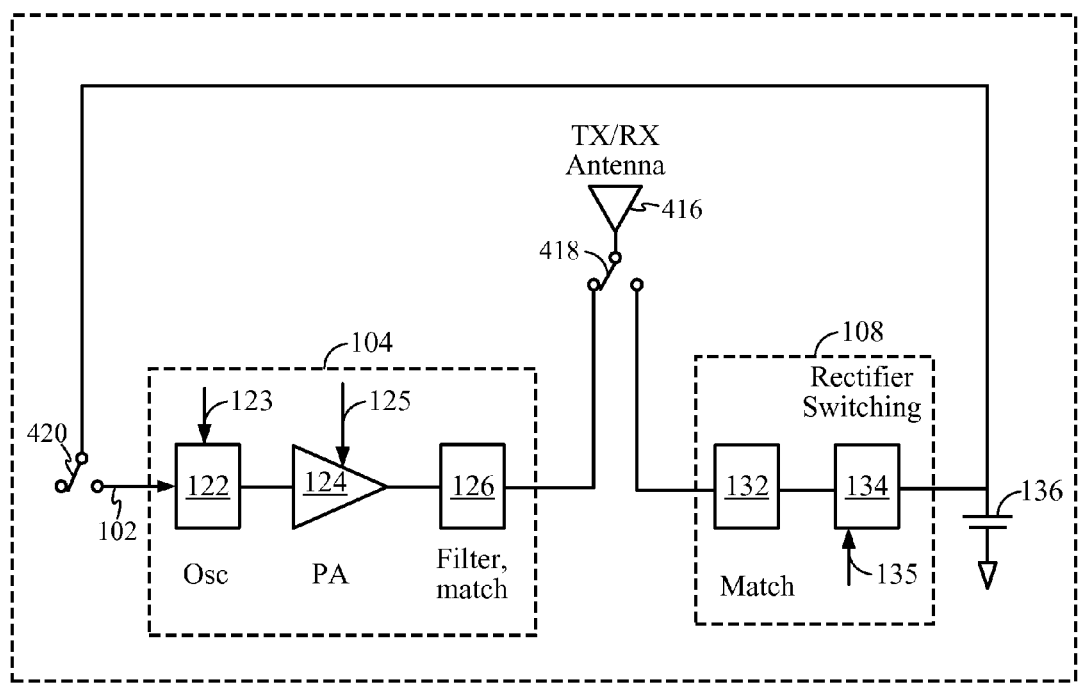
FIG. 6 illustrates a device configured to receive wirelessly transmitted power and to transmit wireless power, in accordance with an exemplary embodiment.

FIG. 6 illustrates a device configured to receive wirelessly transmitted power and to transmit wireless power, in accordance with an exemplary embodiment. A device 400 includes a transmitter 104 and a receiver 108 described above with respect to FIG. 2. Device 400 further includes a transmit/receive antenna 416 switchable according to switch 418 between transmitter 104 and receiver 108 for an exemplary embodiment where a receiver may be reconfigurable to operate as a transmitter to yet another receiver. Furthermore, device 400 further includes a battery 136 which is switchably coupled according to switch 420 to receive charge from receiver 108 or to provide input power 102 to transmitter 104.

In operation as a receiver, device 400 may be configured to receive wirelessly transmitted power from a separate transmitter (not shown) and store the wirelessly receive power in battery 136 during device operation as a receiver. In operation as a transmitter, device 400 may be configured to generate a magnetic near-field using energy stored in battery 136 as the input power 102.

Figure 7:
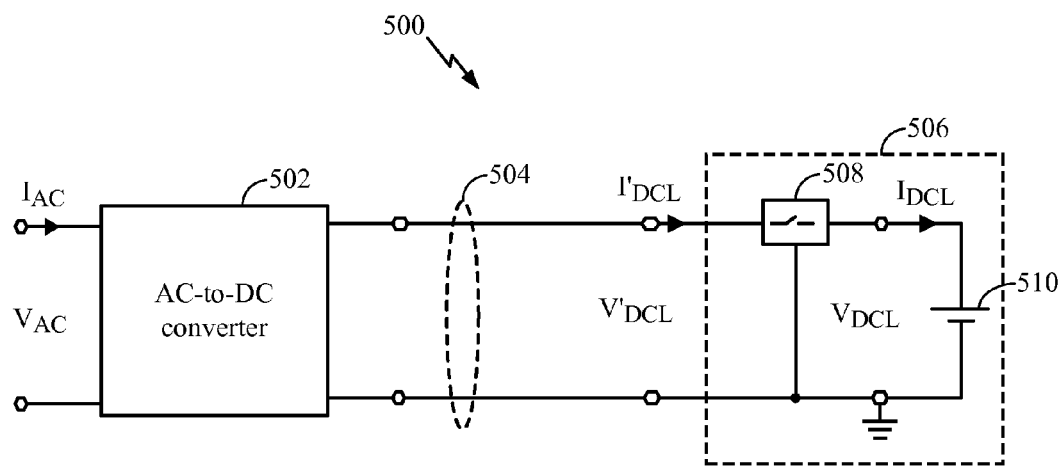
FIG. 7 illustrates a wired power transmission system.

FIG. 7 illustrates a wired power transmission system. A wired power transmission system 500 includes AC input power, $I_{AC}$, $V_{AC}$, operating at an AC frequency, $f_{AC}$. The input power is input into an AC-to-DC converter 502 operating at a switching frequency, $f_{SW}$. A DC cord 504 runs the DC power, $V_{DCL}$, $I_{DCL}$, to device 506 while a switch 508 selectively runs the input power to a battery 510.

A transmission efficiency may be calculated wherein the AC input power, $P_{ACin}$, is defined as, $$P_{ACin} = \frac{1}{T_{AC}} \int_0^{T_{AC}} v_{AC}(t) \cdot i_{AC}(t) dt;$$

$$T_{AC} = \frac{1}{f_{AC}}$$

and the DC input power, $P'_{DCL}$, at the device input charging terminals is defined as, $$P'_{DCL} = \frac{1}{T_{sw}} \int_0^{T_{sw}} v'_{DCL}(t) \cdot i'_{DCL}(t) dt;$$

$$T_{sw} = \frac{1}{f_{sw}}$$

while the DC input power, $P_{DCL}$, at the battery terminals is defined as, $$P_{DCL} = \frac{1}{T_{sw}} \int_0^{T_{sw}} v_{DCL}(t) \cdot i_{DCL}(t) dt;$$

$$T_{sw} = \frac{1}{f_{sw}}.$$

Therefore, efficiency as defined at the device terminals is defined as, $$\eta' = \frac{P'_{DCL}}{P_{ACin}}$$

and overall (end-to-end) efficiency is defined as, $$\eta = \frac{P_{DCL}}{P_{ACin}}$$

while a typical measured efficiency is around 60%-70%.

Figure 8:
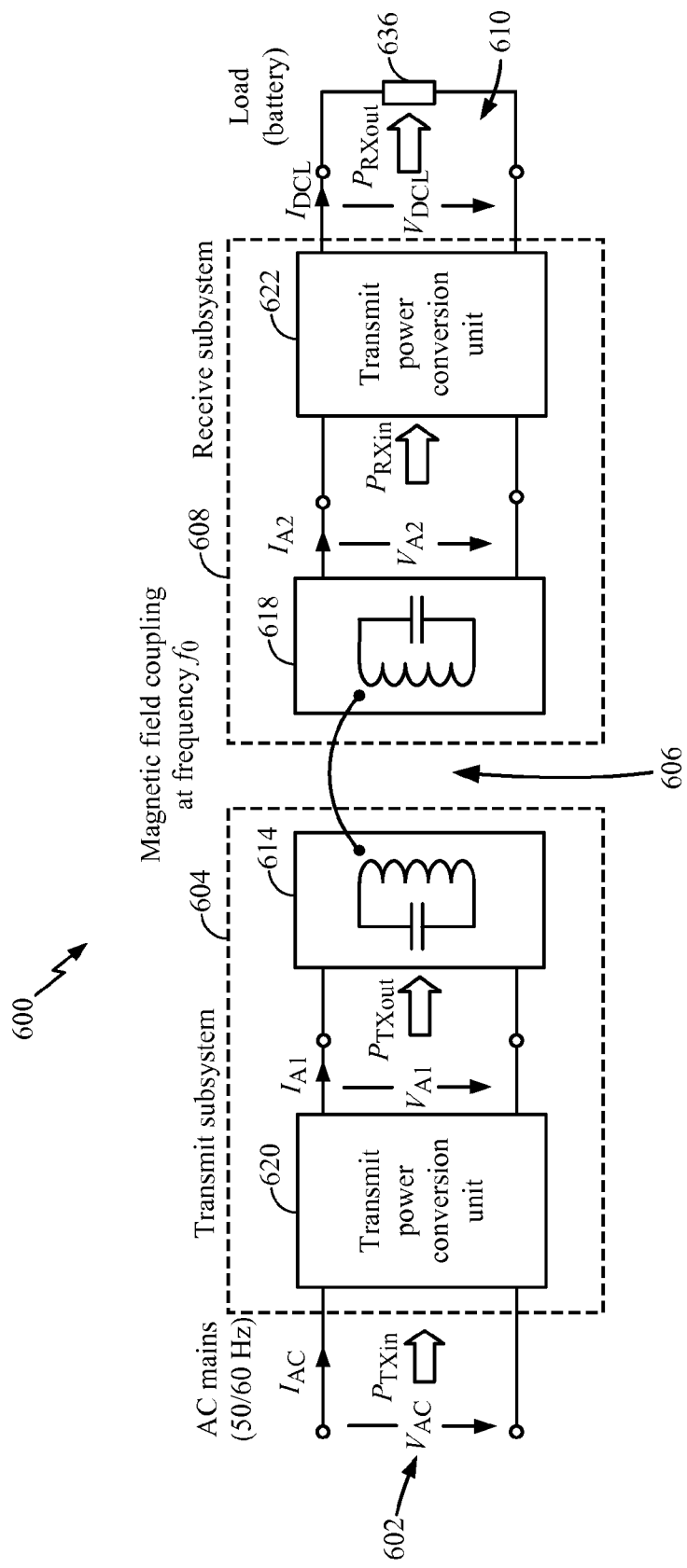
FIG. 8 illustrates a functional block diagram of a wireless power transmission system, in accordance with various exemplary embodiments.

FIG. 8 illustrates a functional block diagram of a wireless power transmission system, in accordance with various exemplary embodiments. Various ports are identified in FIG. 8, including input port 602 and output port 610, for comparison in subsequent figures illustrating coupling variations. Wireless power transmission system 600 includes a transmitter 604 and a receiver 608. Input power $P_{TXin}$ is provided to transmitter 604 for generating a predominantly non-radiative field with coupling k 606 for providing energy transfer. Receiver 608 couples to the non-radiative field 606 and generates an output power $P_{PXout}$ for storing or consumption by a battery or load 636 coupled to the output port 610. Both the transmitter 604 and the receiver 608 are separated by a distance. In one exemplary embodiment, transmitter 604 and receiver 608 are configured according to a mutual resonant relationship and when the resonant frequency, $f_0$, of receiver 608 and the resonant frequency of transmitter 604 are matched, transmission losses between the transmitter 604 and the receiver 608 are minimal while the receiver 608 is located in the "near-field" of the radiated field 606.

Transmitter 604 further includes a transmit antenna 614 for providing a means for energy transmission and receiver 608 further includes a receive antenna 618 for providing a means for energy reception. Transmitter 604 further includes a transmit power conversion unit 620 at least partially function as an AC-to-AC converter. Receiver 608 further includes a receive power conversion unit 622 at least partially functioning as an AC-to-DC converter. Various internal port currents, voltages and power are identified in FIG. 8 for comparison of various coupling variants in subsequent figures.

Figure 9:
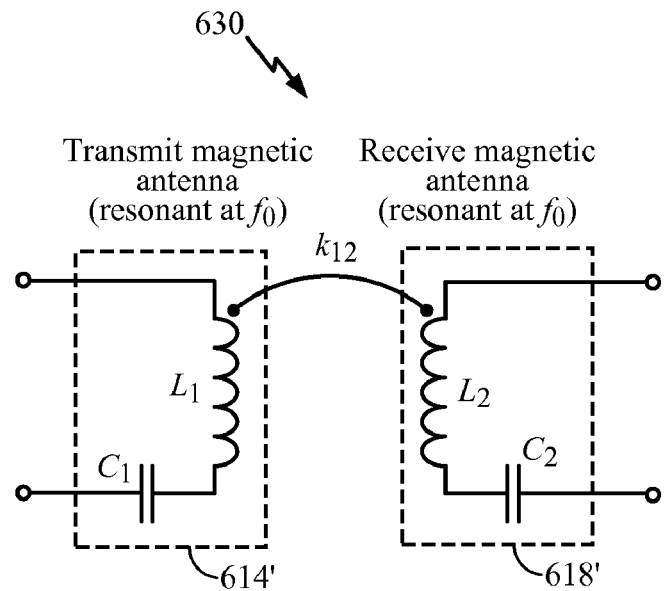
FIG. 9 illustrates a circuit diagram of a first coupling variant between transmit and receive antennas, in accordance with an exemplary embodiment.

FIG. 9 illustrates a circuit diagram of a first coupling variant between transmit and receive antennas, in accordance with an exemplary embodiment. The coupling variant 630 of FIG. 9 illustrates a "proximity" coupling variant finding application, for example, in a Single Device Charging Pad (SDCP) 200 of FIGS. 4A-4C. Coupling variant 630 includes coupled series tank circuits illustrated as a transmit antenna 614' and a receive antenna 618'. Transmit antenna 614' includes a series tank circuit comprised of capacitor $C_1$ and inductor $L_1$ and receive antenna 618' includes another series tank circuit comprised of capacitor $C_2$ and inductor $L_2$.

Coupled series tank circuits generally do not exhibit detuning effects if the coupling factor $k_{12}$ and/or the receiver load (not shown) is changed. Moreover, a series tank circuit with open terminals theoretically does not absorb energy in close proximity of a transmitter, which is in contrast to other coupling variants containing a parallel L-C structure that may absorb relatively high amounts of power independent of the loading at the receive terminals. Accordingly, coupling variant 630 of coupled series tanks provides efficient wireless power transmission for a single or multiple receiver configuration such as is illustrated with respect to FIGS. 4A-4C.

Figure 10:
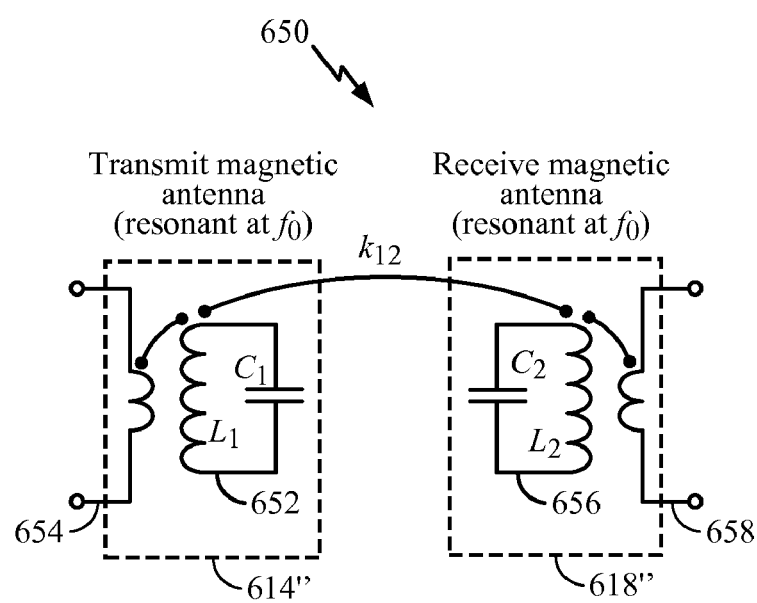
FIG. 10 illustrates a circuit diagram of a second coupling variant between transmit and receive antennas, in accordance with an exemplary embodiment.

FIG. 10 illustrates a circuit diagram of a second coupling variant between transmit and receive antennas, in accordance with an exemplary embodiment. The coupling variant 650 of FIG. 10 illustrates a "vicinity" coupling variant and may be used to couple to a high-Q resonant tank circuit used for "vicinity" coupling. Coupling variant 650 transforms impedances to match with power conversion circuitry resulting in an improved or high transfer efficiency. Specifically, coupling variant 650 includes a resonant transmit antenna 614" and a resonant receive antenna 618".

Transmit antenna 614" includes a high-Q tank resonator 652, including capacitor $C_1$ and inductor $L_1$, and a coupling loop/coil 654. Coupling loop/coil 654 matches the other portions of the transmitter to the high-Q tank resonator 652. Receive antenna 618" includes a high-Q tank resonator 656, including capacitor $C_2$ and inductor $L_2$, and a coupling loop/coil 658. Coupling loop/coil 658 matches the other portions of the receiver to the high-Q tank resonator 656.

Figure 11:
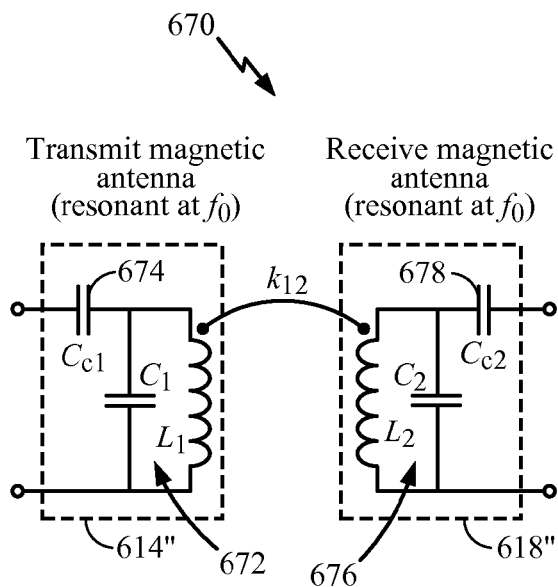
FIG. 11 illustrates a circuit diagram of a third coupling variant between transmit and receive antennas, in accordance with an exemplary embodiment.

FIG. 11 illustrates a circuit diagram of a third coupling variant between transmit and receive antennas, in accordance with an exemplary embodiment. The coupling variant 670 uses capacitive coupling instead of inductive coupling to transform the high impedance of high-Q parallel tank to match with transmit and receive power conversion units of FIG. 8. Specifically, coupling variant 670 includes a transmit antenna 614''' and a receive antenna 618'''.

Transmit antenna 614''' includes a high-Q parallel tank resonator 672, including capacitor $C_1$ and inductor $L_1$, and a coupling capacitor 674. Coupling capacitor 674 matches the other portions of the transmitter to the high-Q parallel tank resonator 672. Receive antenna 618''' includes a high-Q parallel tank resonator 676, including capacitor $C_2$ and inductor $L_2$, and a coupling capacitor 678. Coupling capacitor 678 matches the other portions of the receiver to the high-Q parallel tank resonator 676.

Figure 12:
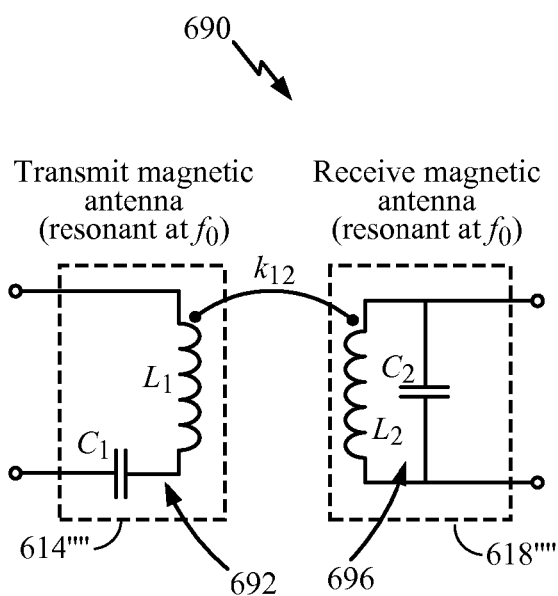
FIG. 12 illustrates a circuit diagram of a fourth coupling variant between transmit and receive antennas, in accordance with an exemplary embodiment.

FIG. 12 illustrates a circuit diagram of a fourth coupling variant between transmit and receive antennas, in accordance with an exemplary embodiment. The coupling variant 690 uses a hybrid configuration of series and parallel tank circuits which may provide specific advantages in some exemplary embodiments with regard to impedance matching of transmit or receive power conversion. Specifically, coupling variant 690 includes a transmit antenna 614'''' and a receive antenna 618''''.

Transmit antenna 614'''' may be configured similarly to transmit antenna 614' of FIG. 9. Transmit antenna 614'''' includes a series tank resonator 692, including capacitor $C_1$ and inductor $L_1$ and receive antenna 618'''' includes a parallel tank resonator 696, including capacitor $C_2$ and inductor $L_2$.

Figure 13:
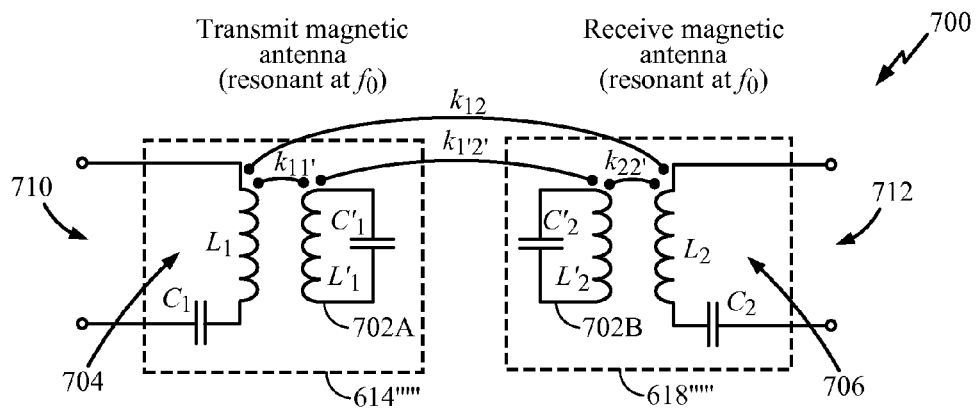
FIG. 13 illustrates a circuit diagram of a fifth coupling variant between transmit and receive antennas, in accordance with an exemplary embodiment.

FIG. 13 illustrates a circuit diagram of a fifth coupling variant between transmit and receive antennas, in accordance with an exemplary embodiment. The coupling variant 700 of FIG. 13 illustrates an embodiment for extending a system that is generally designed for "proximity" coupling using series resonant circuits for "vicinity" coupling. Coupling variant 700 includes a transmit antenna 614'''' and a receive antenna 618''''. Transmit antenna 614'''' includes series tank resonator 704, including capacitor $C_1$ and inductor $L_1$ and receive antenna 618'''' includes a series tank resonator 706, including capacitor $C_2$ and inductor $L_2$. Transmit antenna 614'''' and receive antenna 618'''' may also include one or more parasitic high-Q resonators 702.

In coupling variant 700, a parasitic high-Q resonator 702 is added as either a parasitic high-Q resonator 702A in the transmit antenna 614'''', a parasitic high-Q resonator 702B in the receive antenna 618'''', or parasitic high-Q resonators 702A, 702B in both transmit antenna 614'''' and receive antenna 618''''. Furthermore, matching can be controlled by changing the coupling factors $k_{11'}$ and/or $k_{22'}$. By way of example, a typical Q-value for parasitic high-Q resonator 702A may be on the order of a Q-value greater than 300 and the Q-value for parasitic high-Q resonator 702B may be on the order of a Q-value between 80 and 200.

Parasitic tanks may also be used for impedance conditioning at input port 602 (FIG. 8) and the output port 610 (FIG. 8) of the coupling variants in case the coupling factor $k_{12}$ would vary due to device positioning. Specifically, impedance as seen at input port 602 and the optimum load impedance at the output port 610 may dramatically change, if the coupling factor $k_{12}$ varies, causing a need for impedance adaptation on both sides of the power transfer link usually accomplished by the transmit and receive power converters 620, 622 (FIG. 8). The use of a parasitic tank with a fixed coupling to its series tank ($k_{11'}$) may stabilize this impedance to some degree while relaxing requirements to the transmit and receive power conversion units 620, 622.

Generally, resonant antenna systems are subject of detuning effects from extraneous objects. A receive antenna is typically detuned when integrated into a host device, due to effects of the device's body on magnetic and electric fields. This effect can be accounted for by design and component selection. This is in contrast to a transmit antenna whose detuning may be variable depending on the position of the device. Additionally, the unloaded Q-factor generally will drop due to eddy current losses and dielectric losses in the device's body.

As far as close "proximity" coupling is concerned, tuning of the antennas' resonance frequency may be less necessary, since resonant antennas will likely be highly loaded (i.e., low loaded Q-factors). This may be different in a system designed for "vicinity" coupling, where the operational Q-factors will likely be high, thus requiring compensation for any detuning effects. Furthermore, Q-drop by losses in the device cannot be compensated for but has to be accepted. Depending on the solution, it can affect both transmitter and receiver.

As stated above with reference to FIGS. 8-13, a wireless power transmission system 600 includes a transmitter 604 and a receiver 608 as illustrated in FIG. 8. Wireless power transmission systems may be configured to operate at various resonant frequencies including "low" and "high" frequencies. An example of a low and high frequency embodiments are described. A low frequency (LF) embodiment is described where the transmit frequency, $f_0$=135 kHz (LF ISM-band for RFID systems). A high frequency (HF) embodiment is described where the transmit frequency, $f_0$=13.56 MHz (HF ISM-band for RFID systems). In the following figures, difference between LF and HF systems are identified.

Regarding a transmitter, a low frequency or a high frequency (LF-HF) transmitter is comprised of two main parts, (1) a transmit power conversion unit and (2) a transmit antenna (coupling unit). The transmit antenna basically consists of a loop/coil antenna and the anti-reactor (capacitor) to get the system on resonance.

Figure 14:
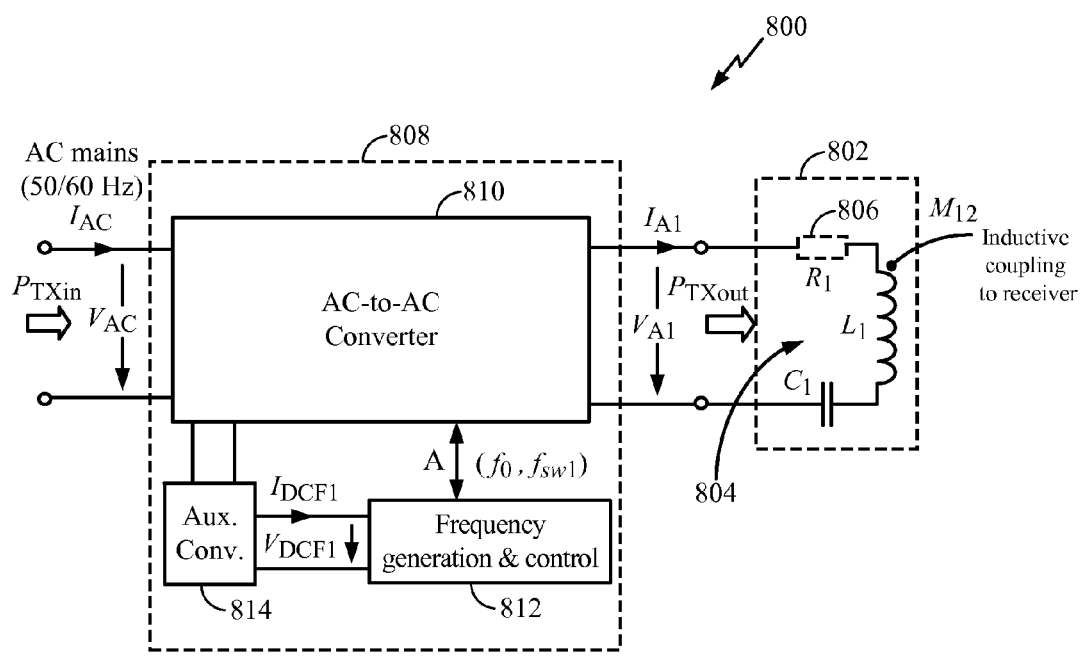
FIG. 14 illustrates a low frequency/high frequency (LF-HF) transmitter, in accordance with an exemplary embodiment.

FIG. 14 illustrates an LF-HF transmitter, in accordance with an exemplary embodiment. An LF-HF transmitter 800 includes a transmit antenna 802 illustrated as a series resonant tank circuit 804 including capacitor $C_1$ and inductor $L_1$. FIG. 14 also illustrates an equivalent resistor 806 representing the antenna's internal losses and external losses due to the resonance dampening effect of objects in the antenna's neighborhood. LF-HF transmitter 800 further includes a transmit power conversion unit 808 comprised of an AC-to-AC converter subunit 810, a frequency generation & control subunit 812 and an auxiliary converter 814 for supplying power to the frequency generation & control subunit 812.

Figure 15A:
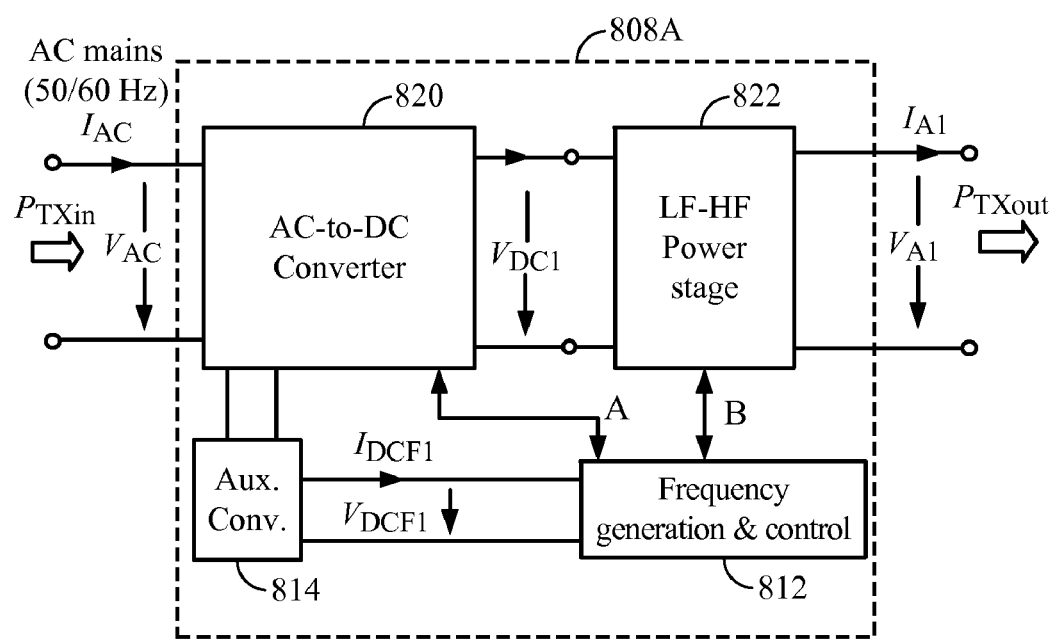
FIGS. 15A-15C illustrate various configurations of multiple stage transmit power conversion units, in accordance with exemplary embodiments.
Figure 15B:
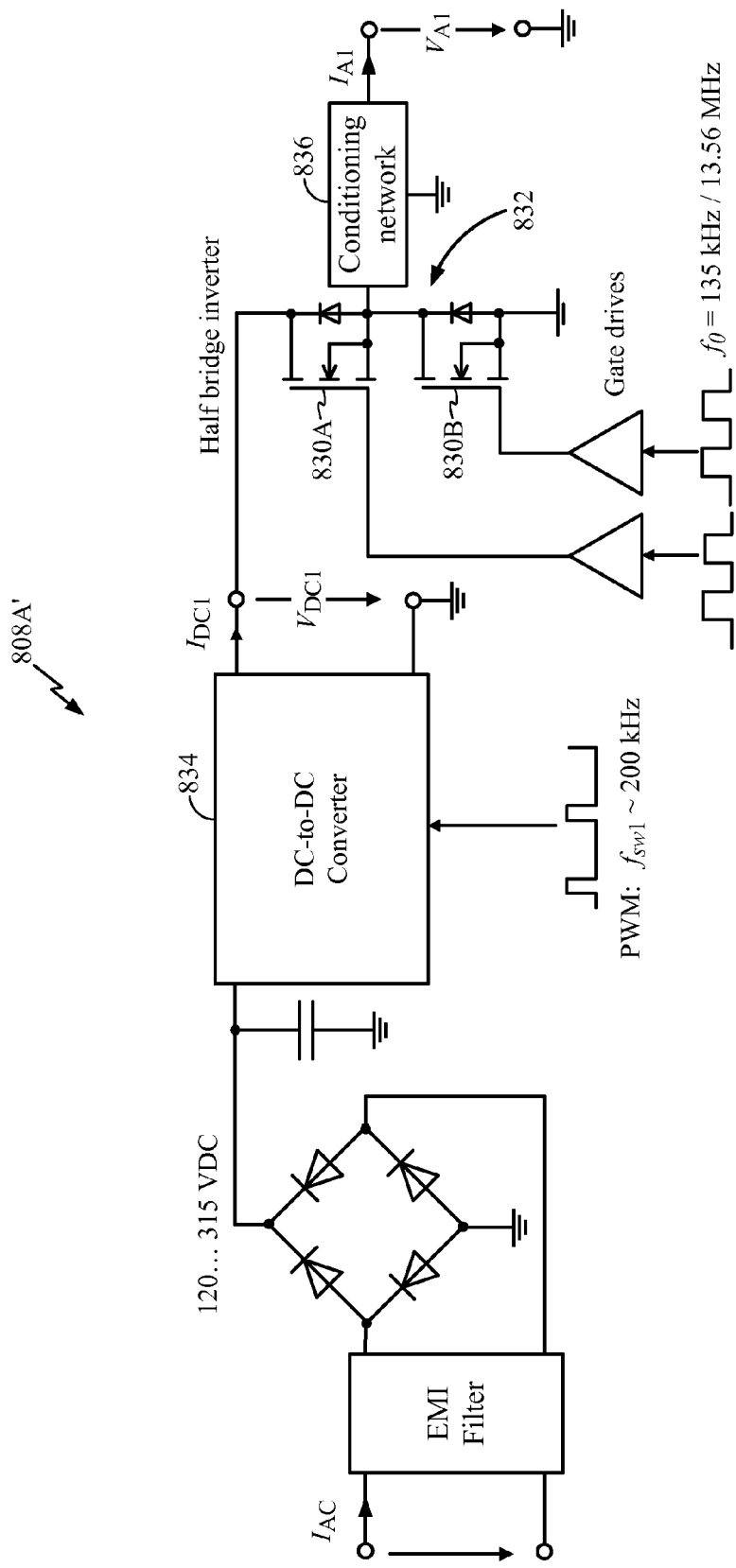
Figure 15C:
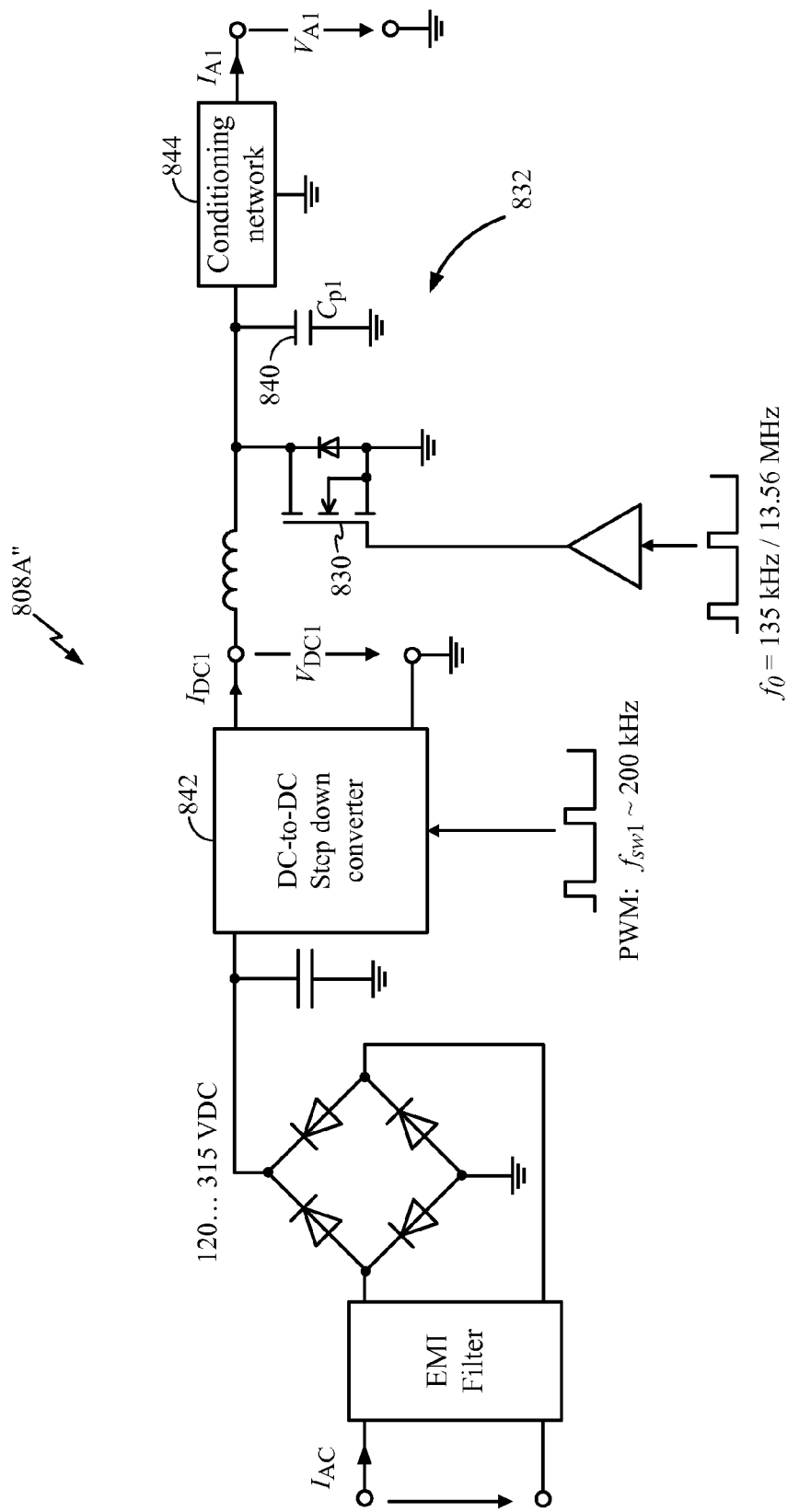

FIGS. 15A-15C illustrate various configurations of multiple stage transmit power conversion units, in accordance with exemplary embodiments. FIG. 15A illustrates a generalized two-stage exemplary embodiment of an LF-HF transmit power conversion unit for generating LF-HF power which includes a AC-to-DC conversion in a first stage followed by an LF-HF power stage. An LF-HF transmit power conversion unit 808A includes an AC-to-DC converter 820 with a variable output power and an LF-HF power stage 822 driven by the frequency generator (not shown) forming part of the frequency generation & control subunit 812. An auxiliary converter 814 provides supply power at a generally lower and fixed voltage. One benefit of a double stage approach of FIG. 15A is the variable DC supply of the power stage that can be used to control power ($P_{TXout}$) into the coupling network.

FIG. 15B illustrates an exemplary embodiment of an LF-HF transmit power conversion unit for generating LF-HF power which includes a half bridge inverter power stage. An LF-HF transmit power conversion unit 808A' includes two FET switches 830A, 830B in configuration forming a half bridge inverter 832. Desirably, to achieve high efficiency, the half bridge inverter 832 switches at voltage/current zero crossings. Therefore, the duty cycle, for example, for LF having a $f_0$=135 kHz gate drive waveform and HF having a $f_0$=13.56 MHz gate drive waveform is fixed around 50%. Power control is accomplished by a DC-to-DC converter 834 providing a PWM controlled variable output voltage $V_{DC1}$. A 50% duty cycle also minimizes harmonic content. Nevertheless, additional PWM control of the half bridge inverter 832 may be useful in some cases.

The DC-to-DC converter 834 may be switched at the operating frequency or at a different frequency (e.g. 200 kHz or higher) adjusted to the requirements. A conditioning network 836 at the output of the transmit power conversion unit 808A' may serve to suppress harmonics and/or increase efficiency, depending on the coupling network. In the present exemplary embodiment, while multiple FET switches 830 may be required, there is typically less voltage stress for the FETs compared to single FET power stages, thus lower cost devices may be used. Furthermore, in the present exemplary embodiment, the half bridge inverter power stage operates like a voltage source (low impedance) and thus may drive any load impedance as long as currents and/or power do not exceed FET ratings. The half bridge inverter is particularly suitable to drive series resonant tanks.

FIG. 15C illustrates another exemplary embodiment of an LF-HF transmit power conversion unit for generating LF-HF power which includes a 'boost converter'-like or class E configured power stage. LF-HF transmit power conversion unit 808A" includes one FET switch 830 configured to form a 'boost converter'-like or class E circuit, with the FET switch "on-time" occurring at zero volts (class E or soft switching approach).

If the LF-HF transmit power conversion unit is to drive a transmit antenna configured as a series resonant tank, this series resonant tank then functions as part of a series $C-L-R_L$ load network typically utilized for class E operation. The gate drive may be additional PWM controlled for impedance matching or power control purposes. Generally, the highest efficiency is achieved at 50% duty cycle. A DC-to-DC step down converter 842 may be switched at the operating frequency or at a different frequency (e.g. 200 kHz or higher) adjusted to the requirements. A conditioning network 844 at the output of the transmit power conversion unit 808A" may serve to suppress harmonics and/or increase efficiency and matching, depending on the coupling network.

Figure 16A:
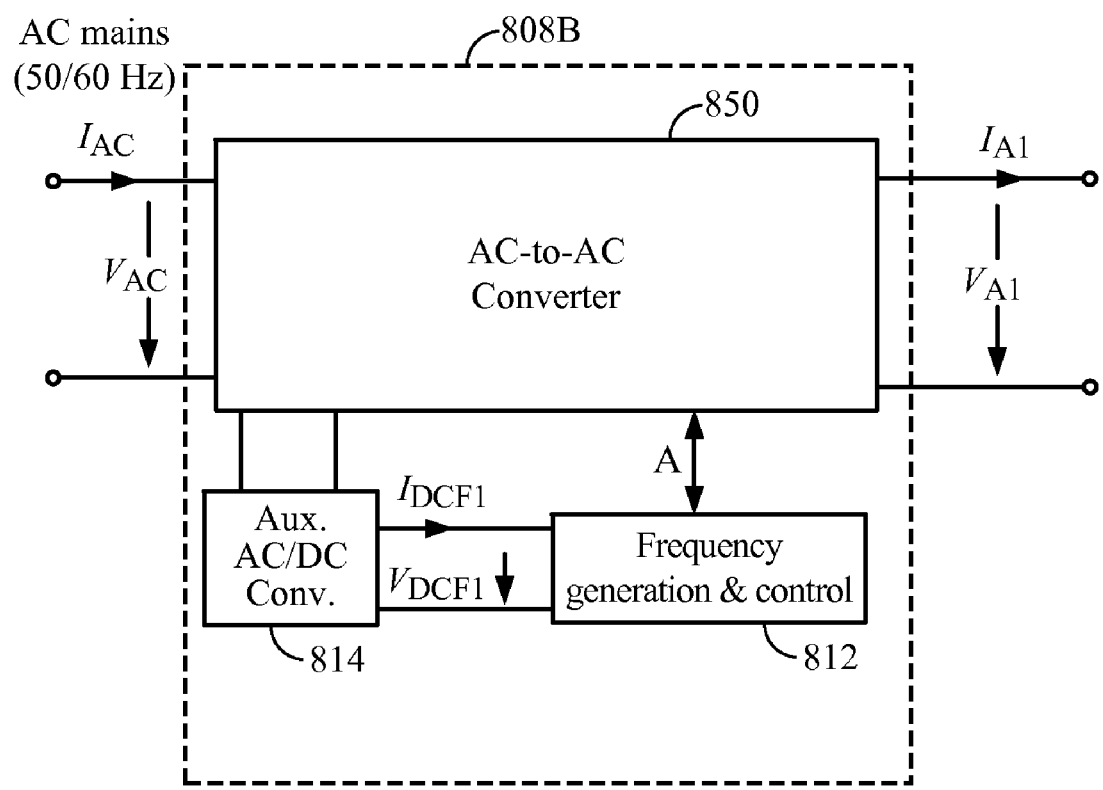
FIGS. 16A-16D illustrate various configurations of single stage transmit power conversion units, in accordance with exemplary embodiments.

FIGS. 16A-16D illustrate various configurations of single stage transmit power conversion units, in accordance with exemplary embodiments. Generation of LF-HF power directly from the main AC voltage using a single stage approach is illustrated in FIG. 16A. Since DC supply voltage may be fixed and high (e.g., in the range 120-315 VDC), power control can be accomplished by means of the duty cycle of the switching waveform (PWM). In this approach, the AC-to-AC converter 850 may be considered as a part of a transformer isolated AC-to-DC power supply. The coupling network acts as an isolation transformer but with high leakage or stray inductance. The transmit power conversion unit 808B further includes of a frequency generation & control subunit 812 and an auxiliary converter 814 for supplying power to the frequency generation & control subunit 812.

Figure 16B:
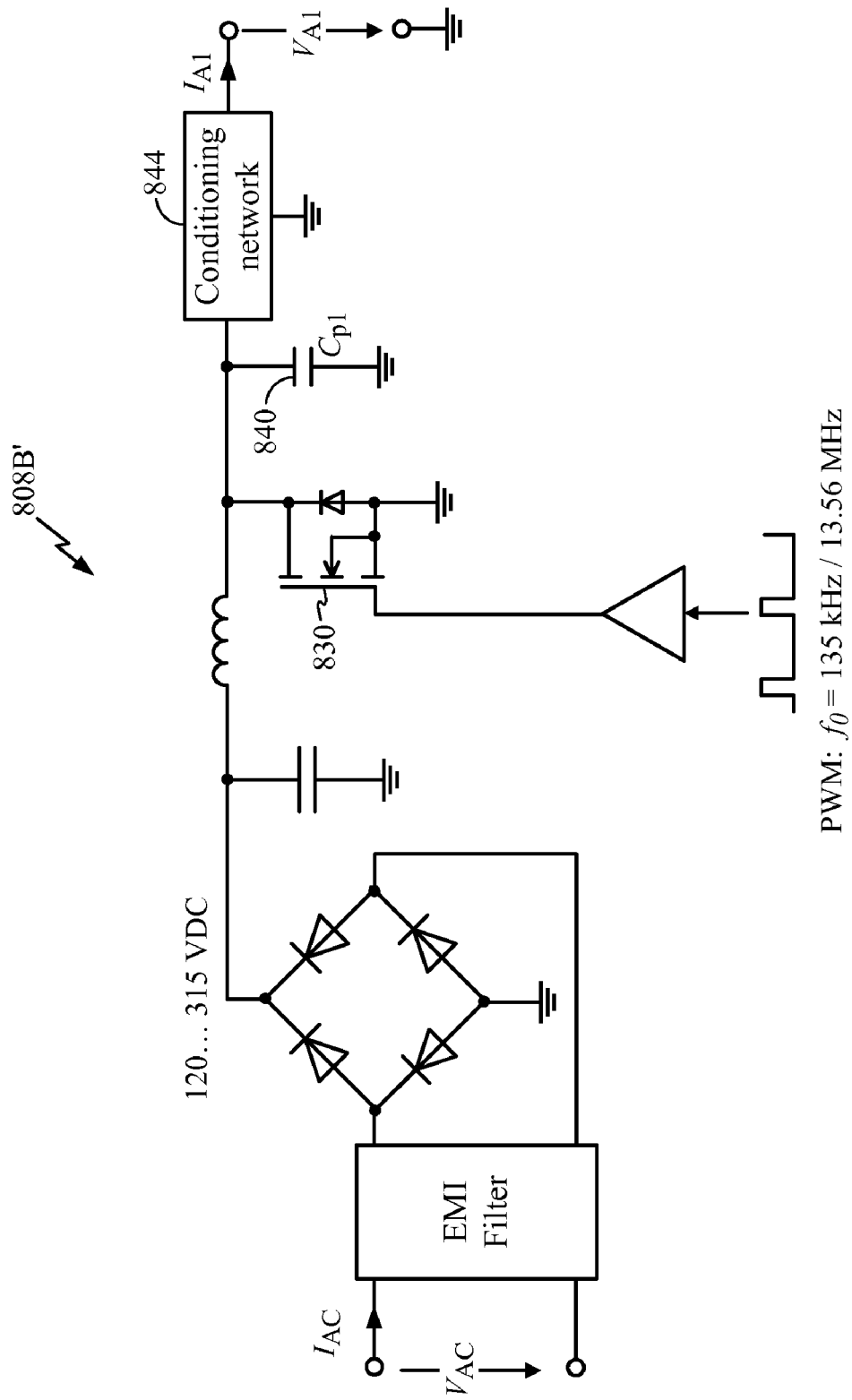

FIG. 16B illustrates an exemplary embodiment of an LF-HF transmit power conversion unit for generating LF-HF power. LF-HF transmit power conversion unit 808W includes one FET switch 830 and the output power control in LF-HF transmit power conversion unit 808B' is accomplished using a PWM gate driving waveform of $f_0=135$ kHz for LF and $f_0=13.56$ MHz for HF, meaning that efficiency may be somewhat compromised at low duty cycles (i.e., conduction angle). However, the duty cycle needed to achieve the target power can be increased by designing the coupling network with a transformation ratio n:1 (n>1), meaning that a high primary voltage is transformed to a low secondary voltage.

If the LF-HF transmit power conversion unit is to drive a transmit antenna configured as a series resonant tank, this series resonant tank then functions as part of a series $C-L-R_L$ load network typically utilized for class E operation. A conditioning network 844 at the output of the transmit power conversion unit 808B' may serve to suppress harmonics and/or increase efficiency and matching, depending on the coupling network. This may be of particular importance for the PWM approach, since harmonic content increases with decreasing duty cycle.

Figure 16C:
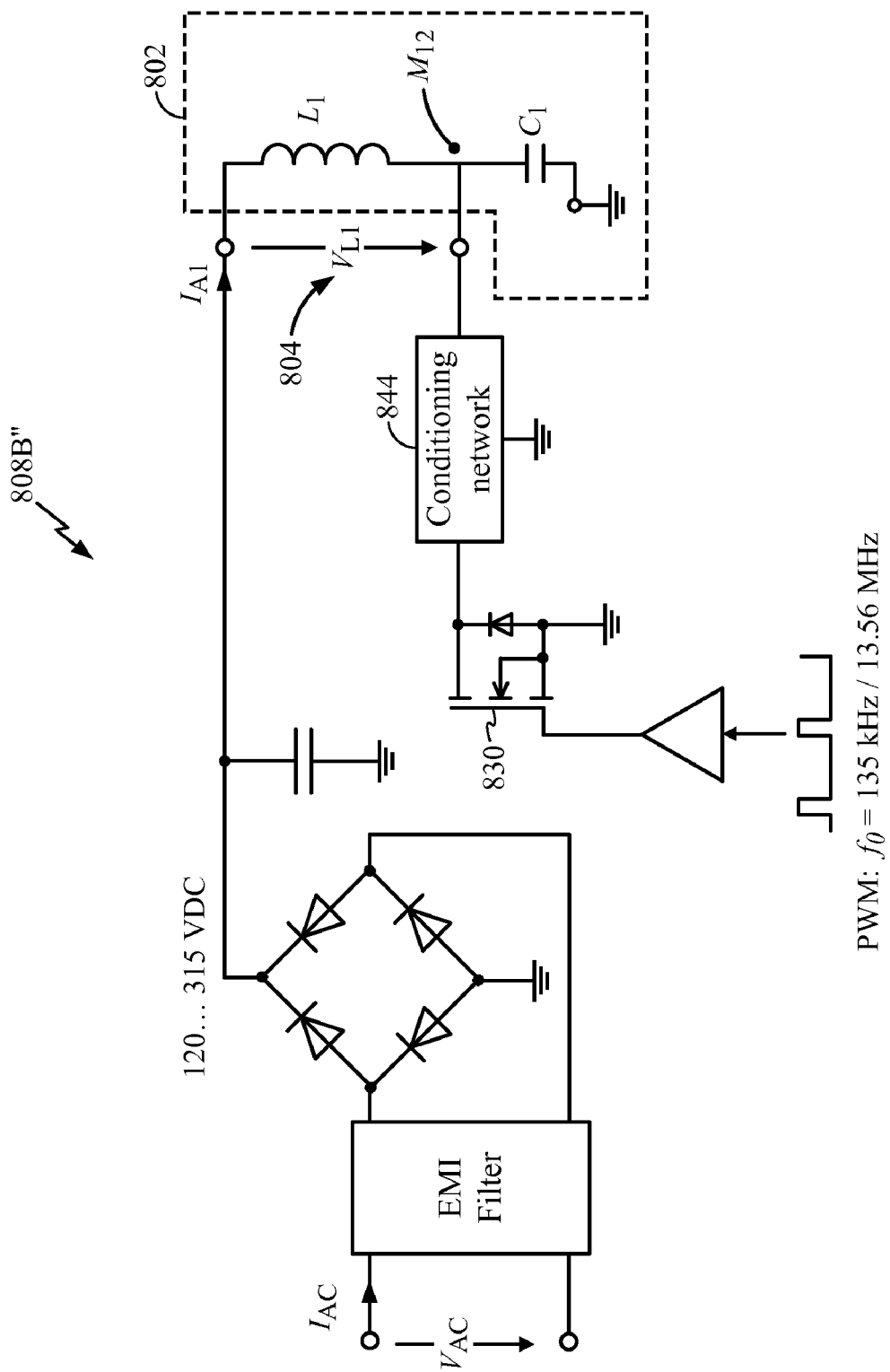

FIG. 16C illustrates another exemplary embodiment of an LF-HF transmit power conversion unit for generating LF-HF power. LF-HF transmit power conversion unit 808B" includes one FET switch 830 forming the power stage. The resonant tank circuit 804 of the transmit antenna 802 is 'suspended' between the DC supply voltage and ground with the power stage connected to the 'hot end' of the resulting tank circuit.

Figure 16D:
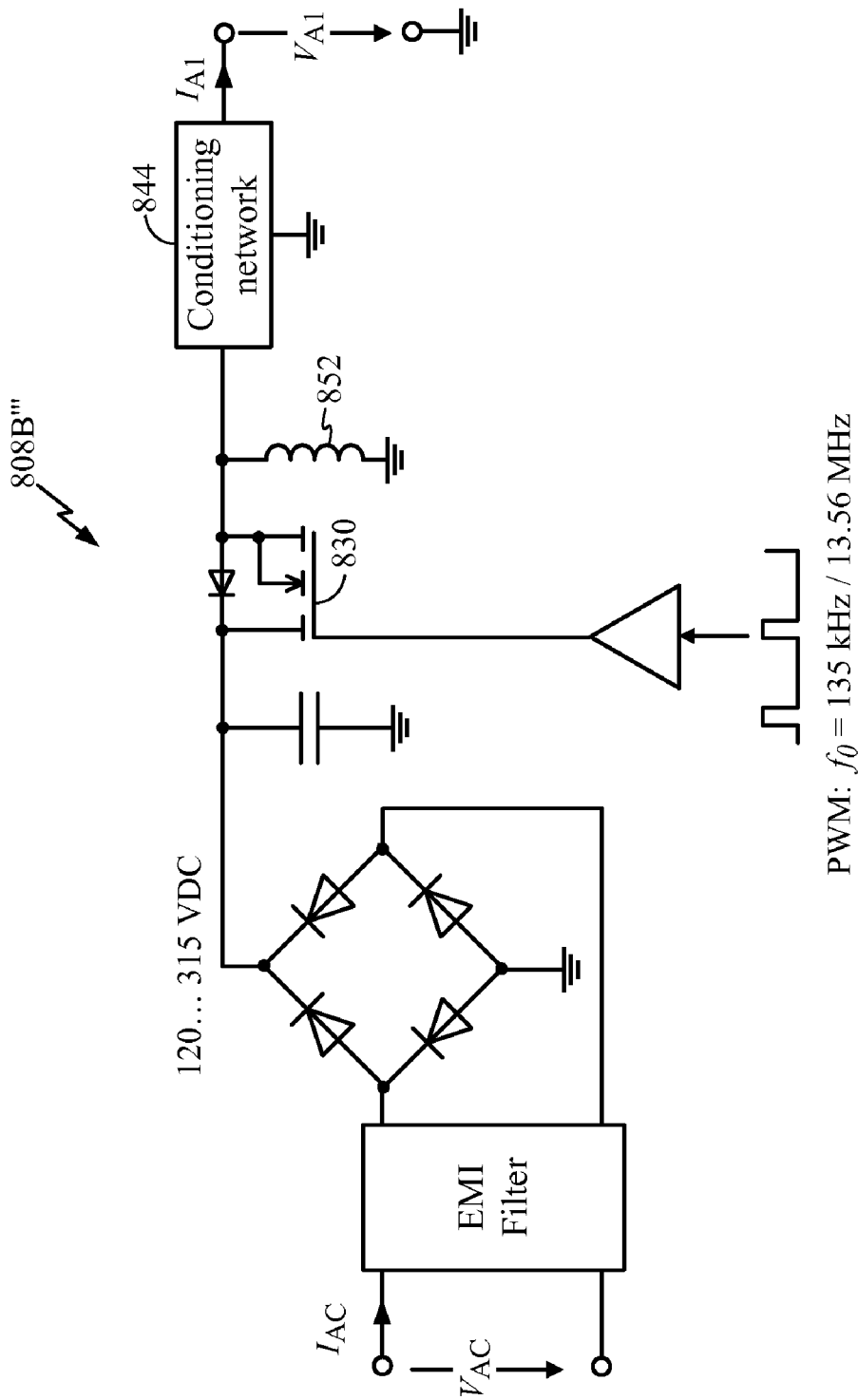

FIG. 16D illustrates another exemplary embodiment of an LF-HF transmit power conversion unit for generating LF-HF power. LF-HF transmit power conversion unit 808B''' includes a FET switch 830 operating in series to a shunt inductance, inductor 852. LF-HF transmit power conversion unit 808B''' may drive a transmit antenna 802 configured as a series resonant tank.

Regarding a receiver, an LF-HF receiver is comprised of two main parts, (1) a receive antenna (coupling unit) and (2) a receive power conversion unit. The receive antenna basically consists of a loop/coil antenna and the anti-reactor (capacitor) to get the system on resonance.

Figure 17:
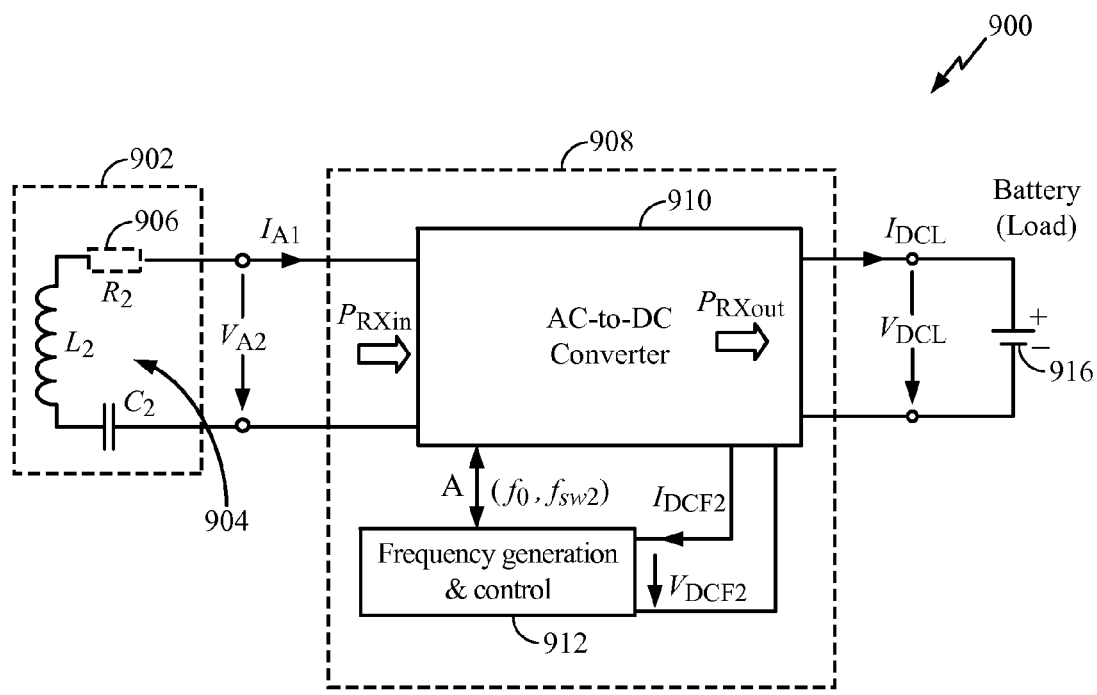
FIG. 17 illustrates an LF-HF receiver, in accordance with an exemplary embodiment.

FIG. 17 illustrates an LF-HF receiver, in accordance with an exemplary embodiment. An LF-HF receiver 900 includes a receive antenna 902 illustrated as a series resonant tank circuit 904 including capacitor $C_2$ and inductor $L_2$. FIG. 17 also illustrates an equivalent resistor 906 representing the antenna's internal losses and external losses due to the resonance dampening effect of objects in the antenna's neighborhood. LF-HF receiver 900 further includes a receive power conversion unit 908 comprised of an AC-to-DC converter subunit 910 and a frequency generation & control subunit 912. FIG. 17 further illustrates LF-HF receiver 900 coupling to a load 916 of the device.

Generally, the various above descriptions of the transmit antenna 802 also find application to receive antenna 902. The power required to supply the frequency generation & control subunit 912 may be received from the receive power conversion unit 908. In one exemplary embodiment, the receive power conversion unit 908 operates in a "minimum mode" by generating sufficient power to feed the frequency generation & control subunit 912 independently of any ability of the load 916 (e.g., battery) to source power to the receive power conversion unit 908, provided power received from the receive antenna exceeds a threshold. Once the frequency generation & control unit 908 is fully operational, the receive power conversion unit 908 enters a "normal mode" and delivers power to the load 916.

In receive power conversion unit 908, frequencies may be required for DC-to-DC conversion and/or for synchronous rectification. With a synchronous rectifier, power flow may be reversed such that the receiver acts as a power transmitter. In the minimum mode, the AC-to-DC converter 910 performs as a passive diode rectifier with additional components to sense charging voltage and current and a switch (not shown) to disconnect the load 916 (e.g., battery). FIG. 17 also illustrates ports and interfaces and designates port currents, voltages and powers.

Figure 18A:
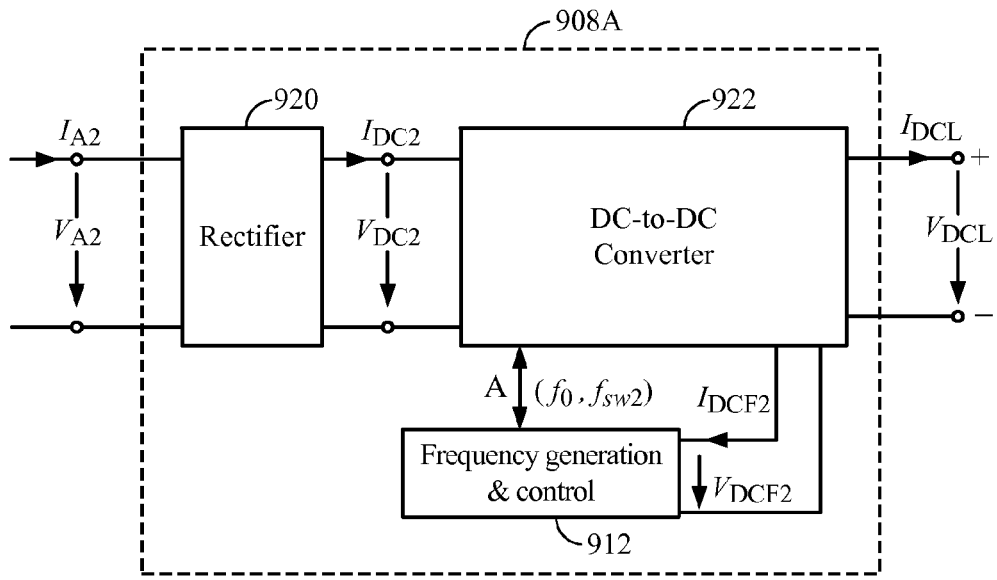
FIGS. 18A-18H illustrate various configurations of a receive power conversion unit, in accordance with various exemplary embodiments.

FIGS. 18A-18H illustrate various configurations of receive power conversion units, in accordance with various exemplary embodiments. FIG. 18A illustrates a receive power conversion unit, in accordance with an exemplary embodiment. LF-HF receive power conversion unit 908A includes an AC rectifier 920 and a DC-to-DC converter unit 922. DC-to-DC converter unit 922 is used to adjust load impedance as seen by the coupling network at the input port of AC rectifier 920 in order to maximize transfer efficiency. In various load ranges, efficiency does not alter significantly if the load impedance is changed. Receive load impedance control may also be used to condition the impedance at the transmit port of the coupling network.

Figure 18B:
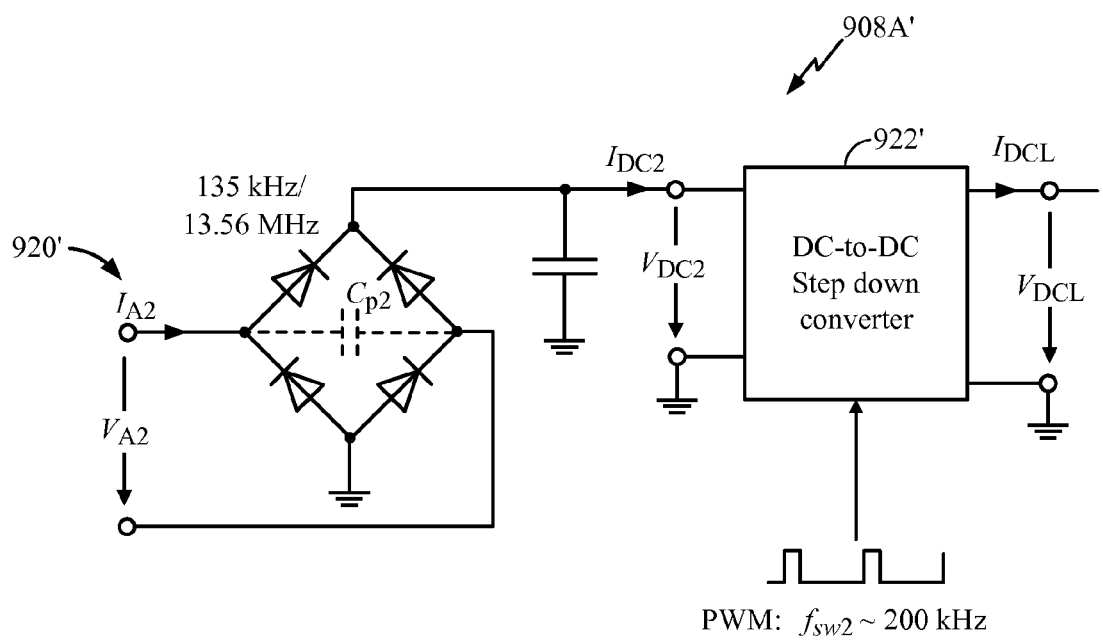

FIG. 18B illustrates another exemplary embodiment of an LF-HF receive power conversion unit. LF-HF receive power conversion unit 908A' includes a quad diode full wave full bridge rectifier 920' and DC-to-DC converter unit 922'. Furthermore, rectifier structure variations of rectifier 920 are also contemplated.

In various practical applications, the load 916 (e.g., battery) has low voltage (e.g. 4 V) and high current (e.g. 1 A) thus imposing a low resistance low (e.g. 4 ohms) requiring a step down converter. Accordingly, the use of a DC-to-DC converter is particularly advantageous, since a DC-to-DC converter allows rectifier 920 to be operated at higher input voltages $V_{A2}$ where a diode's threshold voltages have less impact, thus increasing the efficiency of rectifier 920. Theoretically, the DC-to-DC step down-converter 922' may switch at a different frequency that is determined to achieve maximum efficiency. The load current can be regulated by means of the duty cycle of the PWM switching waveform.

Figure 18C:
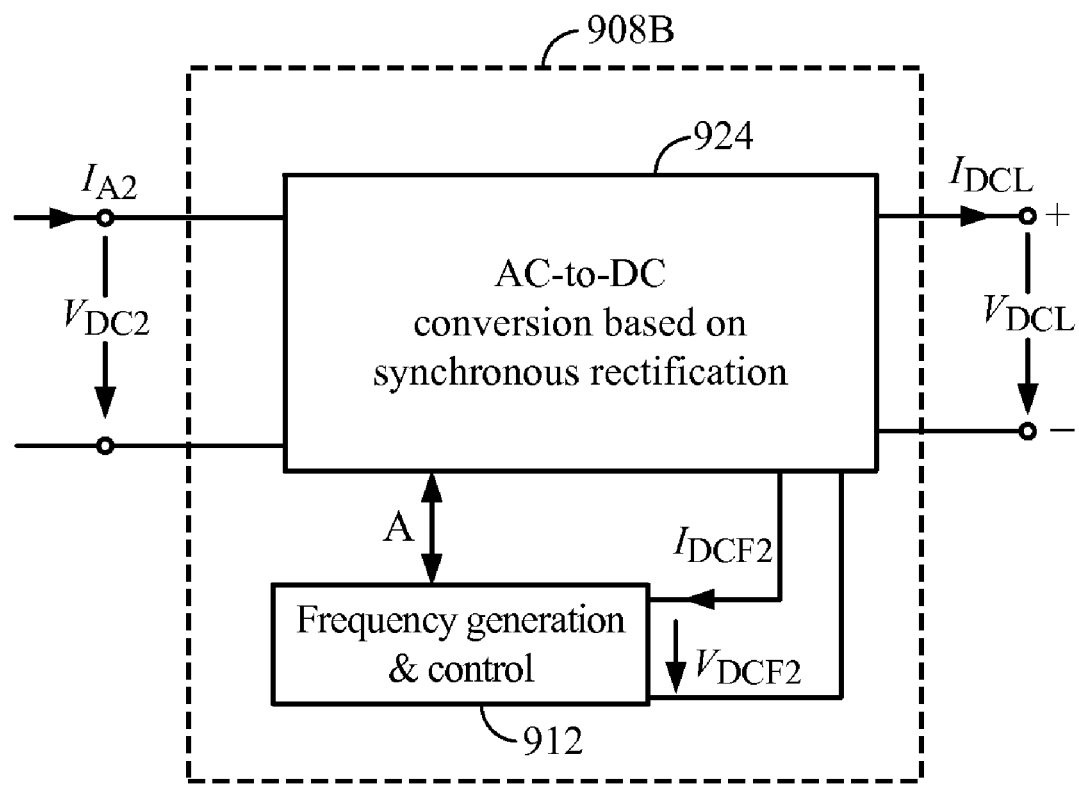

FIG. 18C illustrates another exemplary embodiment of an LF-HF receive power conversion unit. LF-HF receive power conversion unit 908B is based on synchronous rectification, meaning that active FET switches (not shown) are used to rectify the received LF-HF power. The switching waveform must be synchronous to the received signal and the waveform's phase must be adjusted. Adjustment may be accomplished using a voltage/current sense.

The frequency generation and control unit 912 generates the switching waveforms and may perform load power and impedance control by means of PWM. In this exemplary embodiment, the AC-to-DC converter 924 may be considered as the secondary part of a transformer-isolated AC-to-DC power supply. The coupling network acts as an isolation transformer but with high leakage or stray inductance.

Figure 18D:
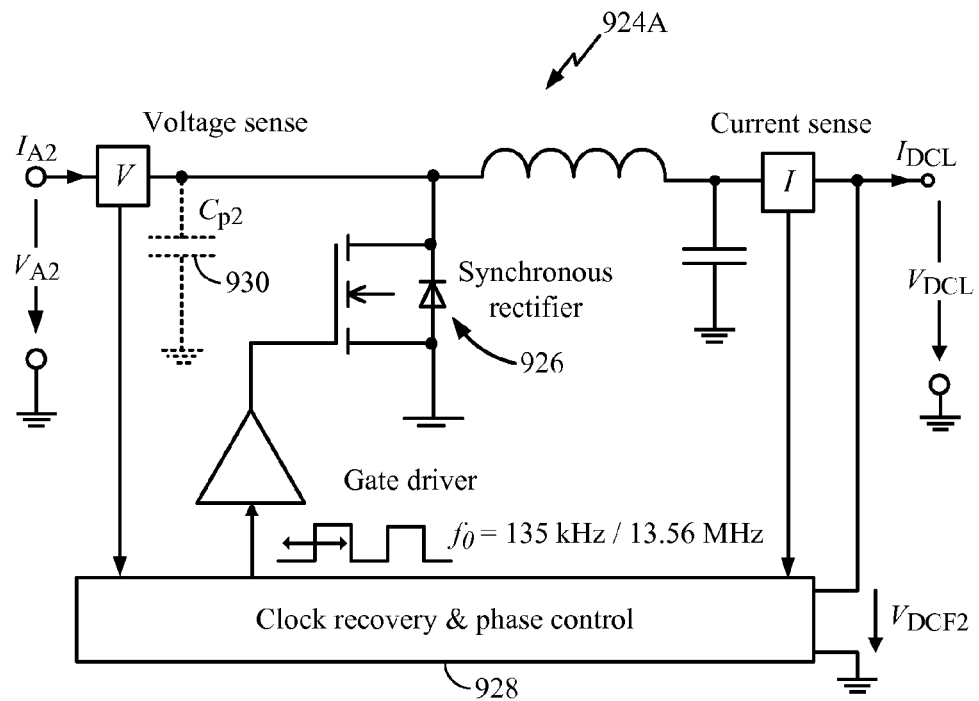
Figure 18D:
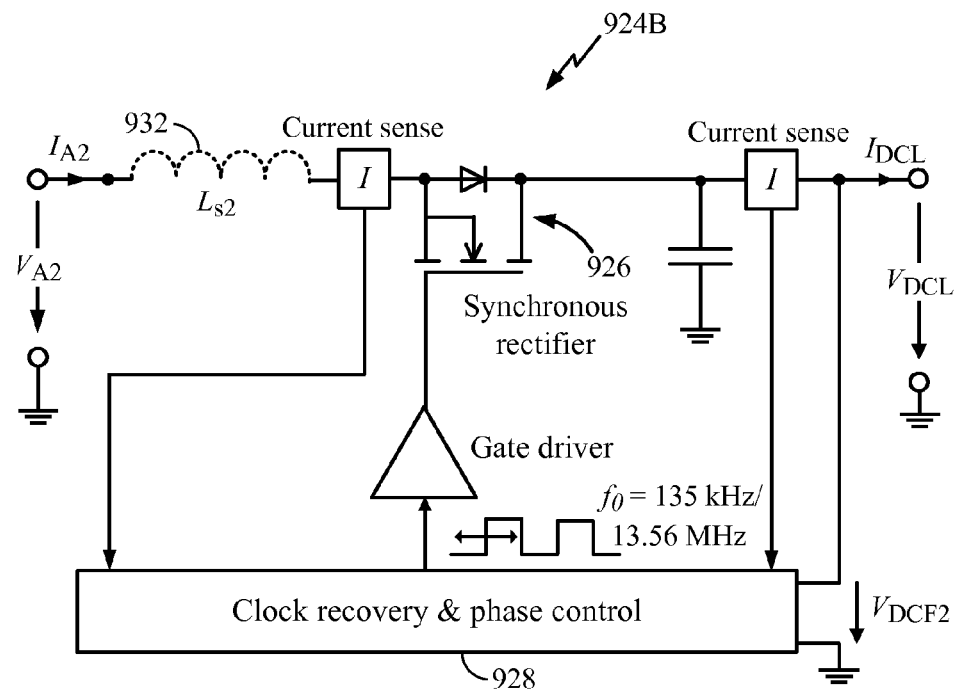

FIG. 18D illustrates exemplary embodiments of an AC-to-DC converter. In the exemplary embodiments, AC-to-DC converter 924A and AC-to-DC converter 924B are configured to also perform synchronous rectification according to a single FET synchronous rectifier 926. A clock recovery and phase angle control 928 is required to properly align the FET drive waveform to the received waveform, so that the synchronous rectifier operates in the right V-I quadrant. These functions may be considered part of the frequency generation & control subunit 912. The FET synchronous rectifier 926 may be operated with reduced/increased duty cycles to control the converters input impedance and power. AC-to-DC converter 924A finds application with a parallel resonant tank in a receive antenna and AC-to-DC converter 924B finds application with a series resonant tank in a receive antenna.

If AC-to-DC converter 924A couples to a series resonant tank in the receive antenna, then a parallel capacitor $C_{p2}$ 930 and switching at zero volts by the FET synchronous rectifier 926 may be needed to avoid FET switching stress. However, capacitor $C_{p2}$ 930 tends to decrease the converters input impedance, which may be counterproductive in a strongly coupled regime (transmitter and receiver in close proximity). If AC-to-DC converter 924B couples to a parallel resonant tank in the receive antenna, then a series inductor $L_{s2}$ 932 may be needed and the FET synchronous rectifier 926 should be opened only at zero current to avoid FET switching stress.

Figure 18E:
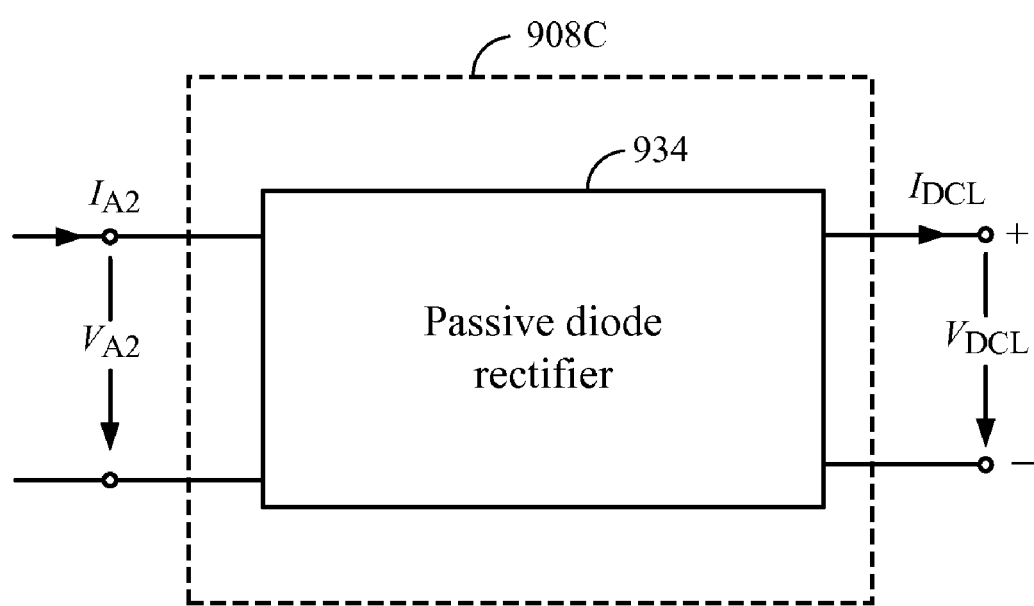

FIG. 18E illustrates another exemplary embodiment of an LF-HF receive power conversion unit. LF-HF receive power conversion unit 908C is based on a passive diode rectifier 934 and is considered particularly suitable for very small form factor micro power devices, where ultimate transfer efficiency may not be the primary issue. However, passive diode rectifiers normally may be difficult to control in terms of load impedance matching and output power. Thus the receiver should be designed and optimized to the coupling regime that is most probable in the envisaged application or use case. A limited control may be incorporated all the same e.g. by changing the configuration of a diode rectifier using static FET switches. Diode rectifiers and rectifiers in general may be categorized as shown:

|  | Current sink | Voltage sink |
|---|---|---|
| Single diode (half wave) | Type a | Type b |
| Double diode (full wave, half bridge) | Type c | Type d |
| Quad diode (full wave, full bridge) | Type e | Type f |

Figure 18F:
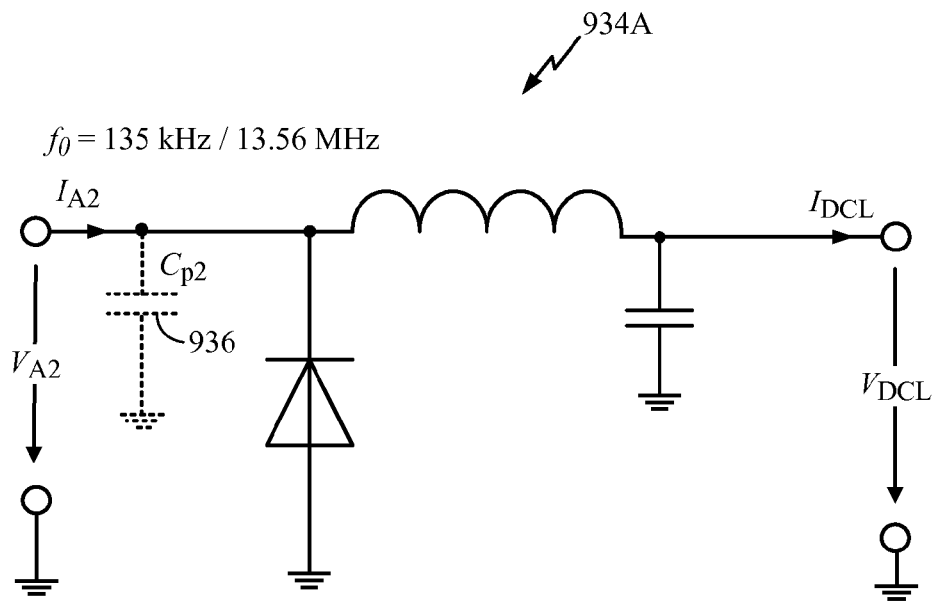
Figure 18F:
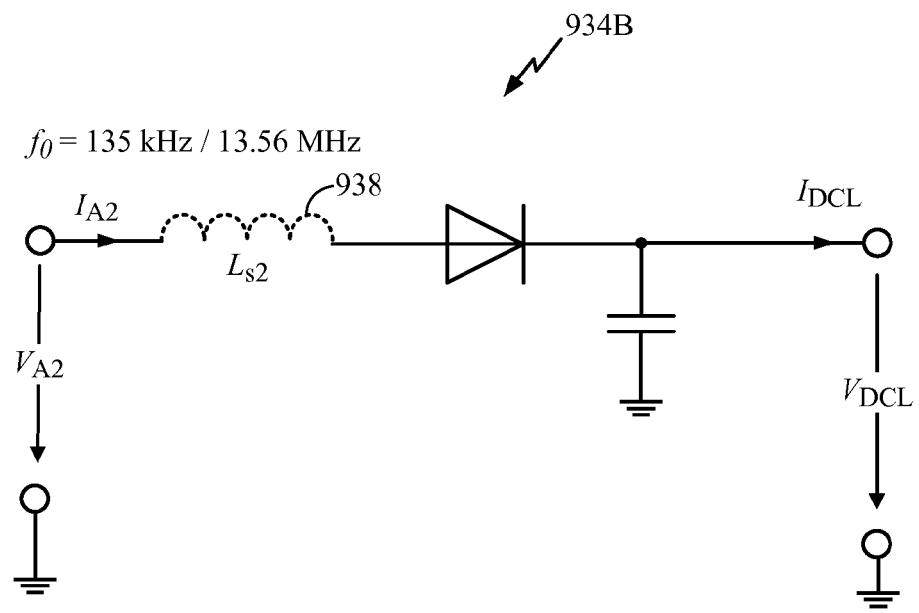

FIG. 18F illustrates exemplary embodiments of a passive diode rectifier. In the exemplary embodiments, passive diode rectifier 934A is a suitable structure to cooperate with a parallel resonant tank in a receive antenna. Passive diode rectifier 934A exhibits an input impedance which is higher than its load impedance, thus performing voltage down conversion. Passive diode rectifier 934B is a suitable structure to cooperate with a series resonant tank in a receive antenna.

If the passive diode rectifier 934A couples to a series resonant tank in the receive antenna, then a parallel capacitor $C_{p2}$ 936 may be needed to avoid diode switching stress. However, capacitor $C_{p2}$ 936 tends to decrease the converters input impedance, which may be counterproductive in a strongly coupled regime (i.e., transmitter and receiver in close proximity). If the passive diode rectifier 934B couples to a parallel resonant tank in a receive antenna, then a series inductor $L_{s2}$ 938 may be needed to avoid diode switching stress.

Figure 18G:
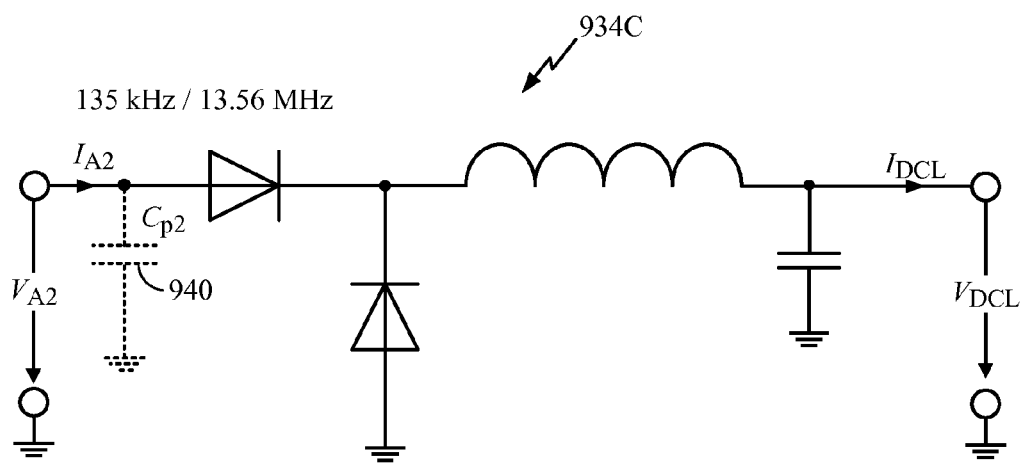
Figure 18G:
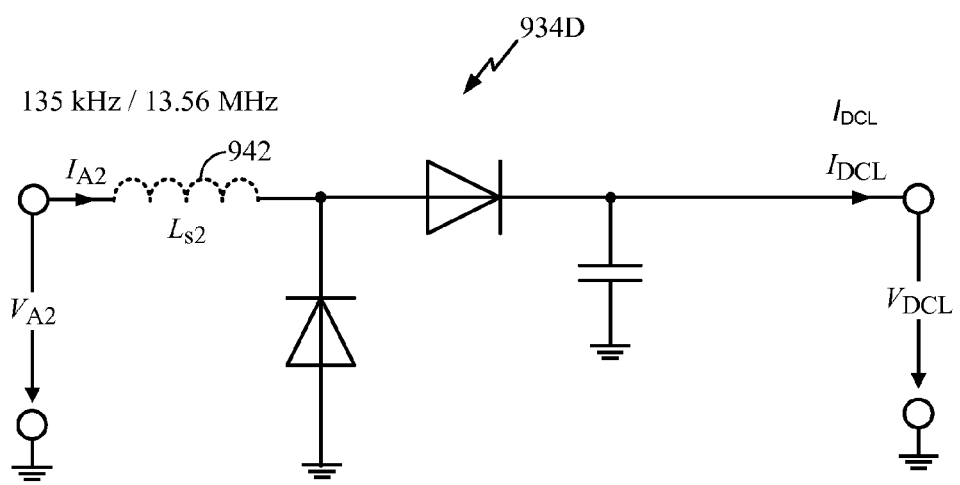

FIG. 18G illustrates exemplary embodiments of a passive diode rectifier. In the exemplary embodiments, passive diode rectifiers 934C, 934D are double diode rectifiers. Passive diode rectifier 934C is a suitable structure to cooperate with a parallel resonant tank in a receive antenna. Passive diode rectifier 934C exhibits an input impedance which is higher than its load impedance and higher than that achieved with passive diode rectifier 934A. Passive diode rectifier 934D is the dual diode structure to passive diode rectifier 934B, and more suitable to be driven from a series resonant tank in a receive antenna. However, passive diode rectifier 934D exhibits a lower input impedance than its load impedance and lower than that achieved with Passive diode rectifier 934B.

If the passive diode rectifier 934C couples to a series resonant tank in a receive antenna, then a parallel capacitor $C_{p2}$ 940 may be required to avoid diode switching stress (high dV/dt). However, parallel capacitor $C_{p2}$ 940 tends to decrease the converters input impedance, which may be counterproductive in a strongly coupled regime (transmitter and receiver in close proximity). If the passive diode rectifier 934D couples to a parallel resonant tank in a receive antenna, then a series inductor $L_{s2}$ 942 may be needed to avoid diode switching stress (high dI/dt).

Figure 18H:
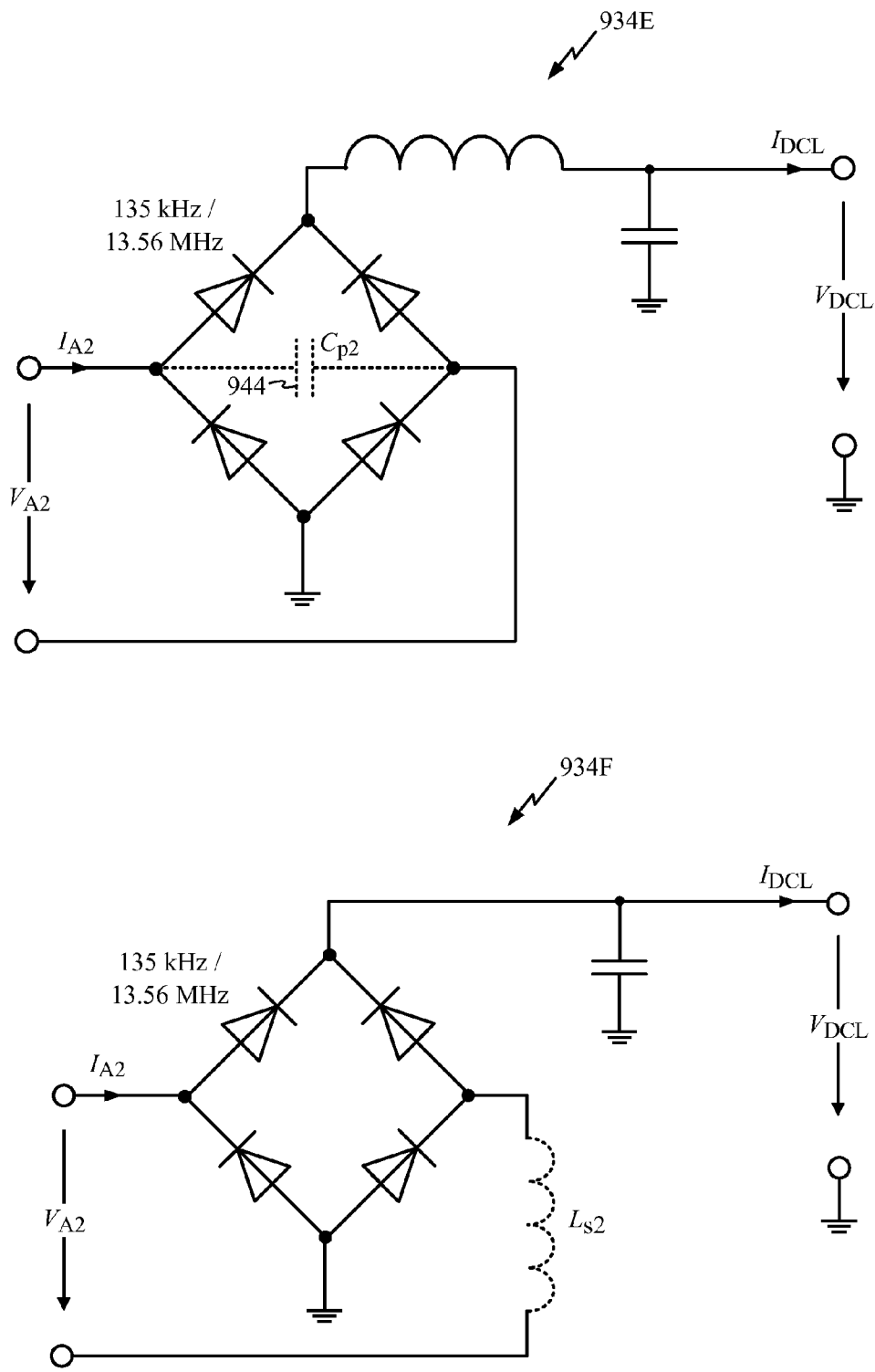

FIG. 18H illustrates exemplary embodiments of a passive diode rectifier. In the exemplary embodiments, passive diode rectifiers 934E, 934F are quad diode rectifiers and may be considered as pair of half bridge (Class D) rectifiers operated in 'push-pull' (anti-phase). Passive diode rectifier 934E operates as a current sink and is a suitable structure to cooperate with a parallel resonant tank in a receive antenna. Passive diode rectifier 934E exhibits an input impedance which is higher than its load impedance and double of that achieved with passive diode rectifier 934C. Passive diode rectifier 934F operates as a voltage sink and is the dual structure of passive diode rectifier 934D, thus more suitable to be driven from a series resonant tank in a receive antenna. However, passive diode rectifier 934F exhibits a lower input impedance than its load impedance but doubles that of passive diode rectifier 934D, which is advantageous in a strongly coupled regime.

If the passive diode rectifier 934E couples to a series resonant tank in a receive antenna, then a parallel capacitor $C_{p2}$ 944 may be required to avoid diode switching stress (high dV/dt). However, parallel capacitor $C_{p2}$ 944 tends to decrease the converters input impedance, which may be counterproductive in a strongly coupled regime (transmitter and receiver in close proximity). If the passive diode rectifier 934F couples to a parallel resonant tank in a receive antenna, then a series inductor $L_{s2}$ 946 may be needed to avoid diode switching stress (high dI/dt).

Figure 19:
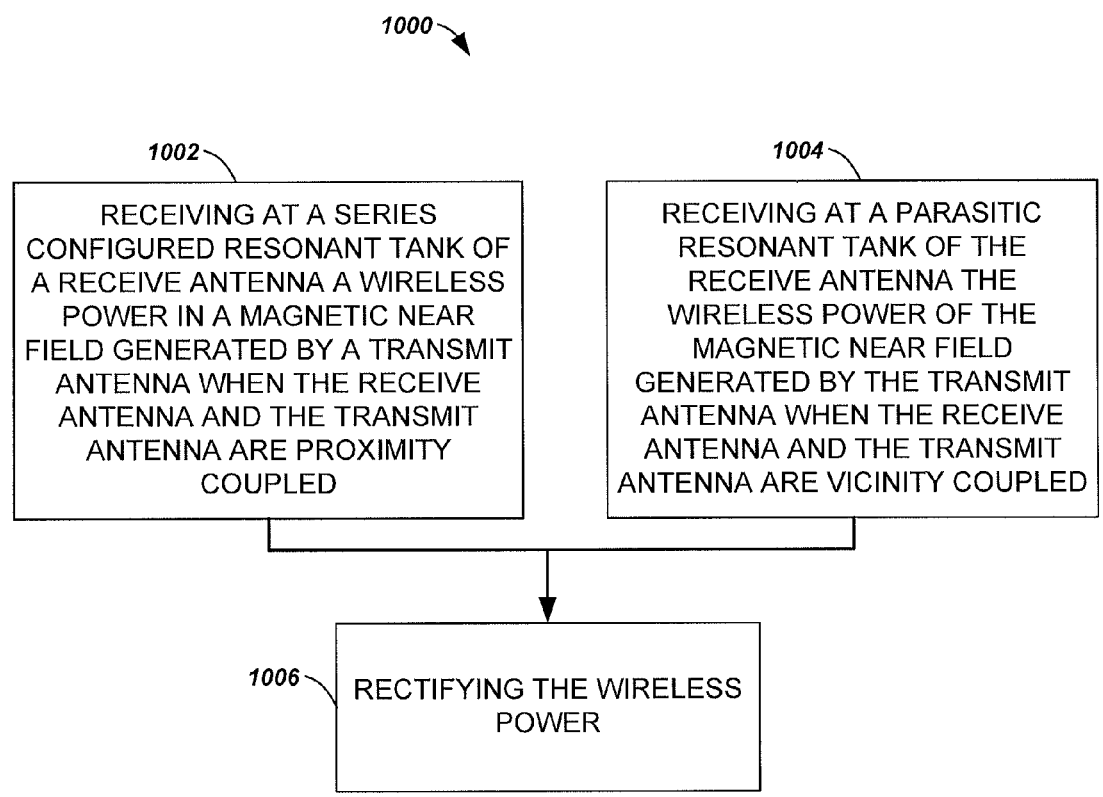
FIG. 19 illustrates a flowchart of a method for receiving wireless power, in accordance with an exemplary embodiment.

FIG. 19 illustrates a flowchart of a method for receiving wireless power, in accordance with an exemplary embodiment. Method 1000 for receiving wireless power is supported by the various structures and circuits described herein. Method 1000 includes a step 1002 for receiving at a series configured resonant tank of a receive antenna, wireless power in a magnetic near field generated by a transmit antenna when the receive antenna and the transmit antenna are proximity coupled. The method 1000 further includes a step 1004 for receiving at a series configured resonant tank of a receive antenna, wireless power in a magnetic near field generated by a transmit antenna when the receive antenna and the transmit antenna are proximity coupled. Furthermore, the method 1000 further includes a step 1006 for receiving at a parasitic resonant tank of the receive antenna, the wireless power of the magnetic near field generated by the transmit antenna when the receive antenna and the transmit antenna are vicinity coupled. The method 1000 further includes a step 1006 fore rectifying the wireless power.

Figure 20:
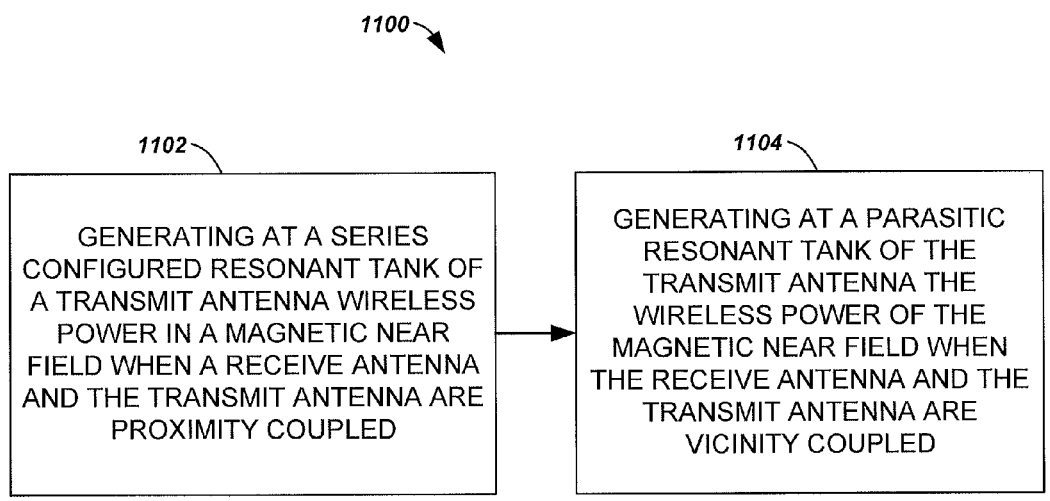
FIG. 20 illustrates a flowchart of a method for transmitting wireless power, in accordance with an exemplary embodiment.

FIG. 20 illustrates a flowchart of a method for transmitting wireless power, in accordance with an exemplary embodiment. Method 1100 for transmitting wireless power is supported by the various structures and circuits described herein. Method 1100 includes a step 1102 for generating at a series configured resonant tank of a transmit antenna wireless power in a magnetic near field when a receive antenna and the transmit antenna are proximity coupled. Method 1100 further includes a step 1104 for generating at a parasitic resonant tank of the transmit antenna the wireless power of the magnetic near field when the receive antenna and the transmit antenna are vicinity coupled.

Those of skill in the art would understand that control information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, and controlled by computer software, or combinations of both. To clearly illustrate this interchangeability of hardware and software, various illustrative components, blocks, modules, circuits, and steps have been described above generally in terms of their functionality. Whether such functionality is implemented and controlled as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be controlled with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The control steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power receiver, comprising:
   a receive antenna configured to receive wireless power from a magnetic field, the receive antenna including:
   a first resonant circuit; and
   a second resonant circuit wirelessly coupled to the first resonant circuit, the second resonant circuit being configured to relay received wireless power to the first resonant circuit.

2. The wireless power receiver of claim 1, wherein the first resonant circuit couples with the magnetic field when the receive antenna is within a proximity that is less than a first distance away from a transmitter generating the magnetic field.

3. The wireless power receiver of claim 2, wherein the second resonant circuit couples with the magnetic field when the receive antenna is within a vicinity that is greater than the distance away from the transmitter.

4. The wireless power receiver of claim 3, wherein the second resonant circuit inductively couples received wireless power to the first resonant circuit.

5. The wireless power receiver of claim 1, wherein the second resonant circuit is a high-Q resonator having a Q-value greater than the first resonant circuit.

6. A wireless power transmitter, comprising:
   a transmit antenna configured to generate a magnetic field for transmission of wireless power, the transmit antenna including:
   a first resonant circuit; and
   a second resonant circuit wirelessly coupled to the first resonant circuit, the second resonant circuit being configured to relay wireless power received from the first resonant circuit to a receive antenna comprising a third resonant circuit.

7. The wireless power transmitter of claim 6, wherein the first resonant circuit generates the magnetic field when the transmit antenna is within a proximity that is less than a first distance away from a receiver receiving the wireless power from the magnetic near field.

8. The wireless power transmitter of claim 7, wherein the second resonant circuit generates the magnetic field when the transmit antenna is within a vicinity that is greater than the distance away from the receiver.

9. The wireless power transmitter of claim 8, wherein the first resonant circuit inductively couples the wireless power to the second resonant circuit.

10. The wireless power transmitter of claim 6, wherein the second resonant circuit is a high-Q resonator having a Q-value greater than the first resonant circuit.

11. A wireless power transmission system, comprising:
    a transmitter including a transmit antenna for generating a magnetic field for transmission of wireless power, the transmit antenna including a first resonant circuit;
    a receiver including a receive antenna for coupling with the transmit antenna to receive the wireless power from the magnetic field, the receive antenna including a second resonant circuit; and
    a third resonant circuit wirelessly coupled to one of the first and second resonant circuits, the third resonant circuit being configured to relay wireless power from or to one of the first and second resonant circuits.

12. The wireless power transmission system of claim 11, further comprising a fourth resonant circuit wirelessly coupled to the other of the first and second resonant circuits, the fourth resonant circuit being configured to relay wireless power to or from the other of the first and second resonant circuits.

13. The wireless power transmission system of claim 12, wherein the first and second resonant circuits are configured for the wireless power transmission therebetween when the transmit antenna is within a proximity that is less than a first distance away from the receive antenna.

14. The wireless power transmission system of claim 13, wherein the third and fourth resonant circuits are configured for the wireless power transmission therebetween when the transmit antenna is within a vicinity that is greater than the distance away from the receive antenna.

15. The wireless power transmission system of claim 11, wherein the one of the first and second resonant circuits inductively couples wireless power to the third resonant circuit.

16. A method for receiving wireless power, comprising:
    receiving at a first resonant circuit of a receive antenna wireless power in a magnetic field generated by a transmit antenna when the receive antenna and the transmit antenna are within a proximity that is less than a distance away;
    receiving at a second resonant circuit of the receive antenna the wireless power of the magnetic field generated by the transmit antenna when the receive antenna and the transmit antenna are within a vicinity that is greater than the distance away, the second resonant circuit being wirelessly coupled to the first resonant circuit and being configured to relay received wireless power to the first resonant circuit; and
    rectifying the wireless power.

17. The method for receiving wireless power of claim 16, further comprising inductively coupling the wireless power from the second resonant circuit to the first resonant circuit when the receive antenna and the transmit antenna are within the vicinity that is greater than the distance away.

18. The method for receiving wireless power of claim 16, wherein the second resonant circuit is a high-Q resonator having a Q-value greater than the first resonant circuit.

19. A method for transmitting wireless power, comprising:
    generating at a first resonant circuit of a transmit antenna wireless power in a magnetic field when a receive antenna and the transmit antenna are within a proximity that is less than a distance away; and
    generating at a second resonant circuit of the transmit antenna the wireless power of the magnetic field when the receive antenna and the transmit antenna are within a vicinity that is greater than the distance away, the second resonant circuit being wirelessly coupled to the first resonant circuit and being configured to relay wireless power received from the first resonant circuit.

20. The method for transmitting wireless power of claim 19, further comprising inductively coupling the wireless power from the first resonant circuit to the second resonant circuit when the receive antenna and the transmit antenna are within the vicinity that is greater than the distance away.

21. The method for transmitting wireless power of claim 19, wherein the second resonant circuit is a high-Q resonator having a Q-value greater than the first resonant circuit.

22. A wireless power receiver, comprising:
  means for receiving at a first resonant circuit of a receive antenna wireless power in a magnetic field generated by a transmit antenna when the receive antenna and the transmit antenna are within a proximity that is less than a distance away;
  means for receiving at a second resonant circuit of the receive antenna the wireless power of the magnetic field generated by the transmit antenna when the receive antenna and the transmit antenna are within a vicinity that is greater than the distance away, the second resonant circuit being wireless coupled to the first resonant circuit and being configured to relay received wireless power to the first resonant circuit; and
  means for rectifying the wireless power.

23. A wireless power transmitter, comprising:
  means for generating at a first resonant circuit of a transmit antenna wireless power in a magnetic field when a receive antenna and the transmit antenna are within a proximity that is less than a distance away; and
  means for at a second resonant circuit of the transmit antenna the wireless power of the magnetic field when the receive antenna and the transmit antenna are within a vicinity that is greater than the distance away, the second resonant circuit being wirelessly coupled to the first resonant circuit and being configured to relay wireless power received from the first resonant circuit.

* * * * *